US012656881B2

(12) United States Patent
Langelaan et al.

(10) Patent No.: US 12,656,881 B2
(45) Date of Patent: Jun. 16, 2026

(54) USER INPUT UNIT

(71) Applicant: Wooting Technologies B.V., LV Ermelo (NL)

(72) Inventors: Johannes Jacobus Maria Langelaan, LV Ermelo (NL); Calder Nicolaas Limmen, LV Ermelo (NL); Erik Arnoldus Wilhelmus Stakenborg, LV Ermelo (NL); Kuo-Ming Wang, LV Ermelo (NL)

(73) Assignee: Wooting Technologies B.V., Ermelo (NL)

( * ) Notice: Subject to any disclaimer, the term of this patent is extended or adjusted under 35 U.S.C. 154(b) by 0 days.

(21) Appl. No.: 19/011,887

(22) Filed: Jan. 7, 2025

(65) Prior Publication Data

US 2025/0224814 A1     Jul. 10, 2025

(30) Foreign Application Priority Data

Jan. 10, 2024    (NL) ..................................... 2036779

(51) Int. Cl.
*G06F 3/02*          (2006.01)
*G06F 3/03*          (2006.01)

(52) U.S. Cl.
CPC .............. *G06F 3/0202* (2013.01); *G06F 3/03* (2013.01)

(58) Field of Classification Search
CPC ....... G06F 3/0202; G06F 3/03; H01H 25/002; H01H 25/06; H01H 2221/01;
(Continued)

(56) References Cited

U.S. PATENT DOCUMENTS 6,927,348 B1 *    8/2005    Schmidt ................. H01H 19/11
                                                          200/336
2006/0137964 A1 *  6/2006    Liu ......................... H01H 19/63
                                                          200/336
(Continued)

FOREIGN PATENT DOCUMENTS

CN          113992196 A      1/2022
CN          114204932 A      3/2022

OTHER PUBLICATIONS

Search Report for corresponding Netherlands Appl. No. NL2036779, dated Mar. 30, 2024, 9 pages, no English translation.

*Primary Examiner* — Amit Chatly
(74) *Attorney, Agent, or Firm* — Farber LLC

(57)          ABSTRACT

The invention relates to a user input unit comprising a housing configured to be attached to a base of a user input device, such as a keyboard. The input unit also has a first movable element coupled to the housing, the first movable element being movable along a first direction and user operable second movable element coupled to the housing, the second movable element being movable along a second direction, the second direction being different from the first direction. Further a transmission configured to transfer movement of the second movable element along the second direction into movement of the first movable element along the first direction is provided. The invention also relates to a user input device, such as a keyboard, comprising a base, such a user input unit, and a sensor configured to sense a movement or a position of the first movable element along the first direction.

20 Claims, 16 Drawing Sheets

(58) Field of Classification Search
CPC ........... H01H 2221/066; H01H 19/605; H01H
19/63; H01H 19/6355; H01H 2223/028;
H03K 2017/9713; H03K 2217/94068;
H03K 17/97; H03K 17/972; H03K
2217/9651
See application file for complete search history.

(56) References Cited

U.S. PATENT DOCUMENTS

2021/0255711 A1*   8/2021   Wang .................... G06F 3/0213
2022/0216019 A1*   7/2022   Modlinski .......... H01H 19/6355

\* cited by examiner

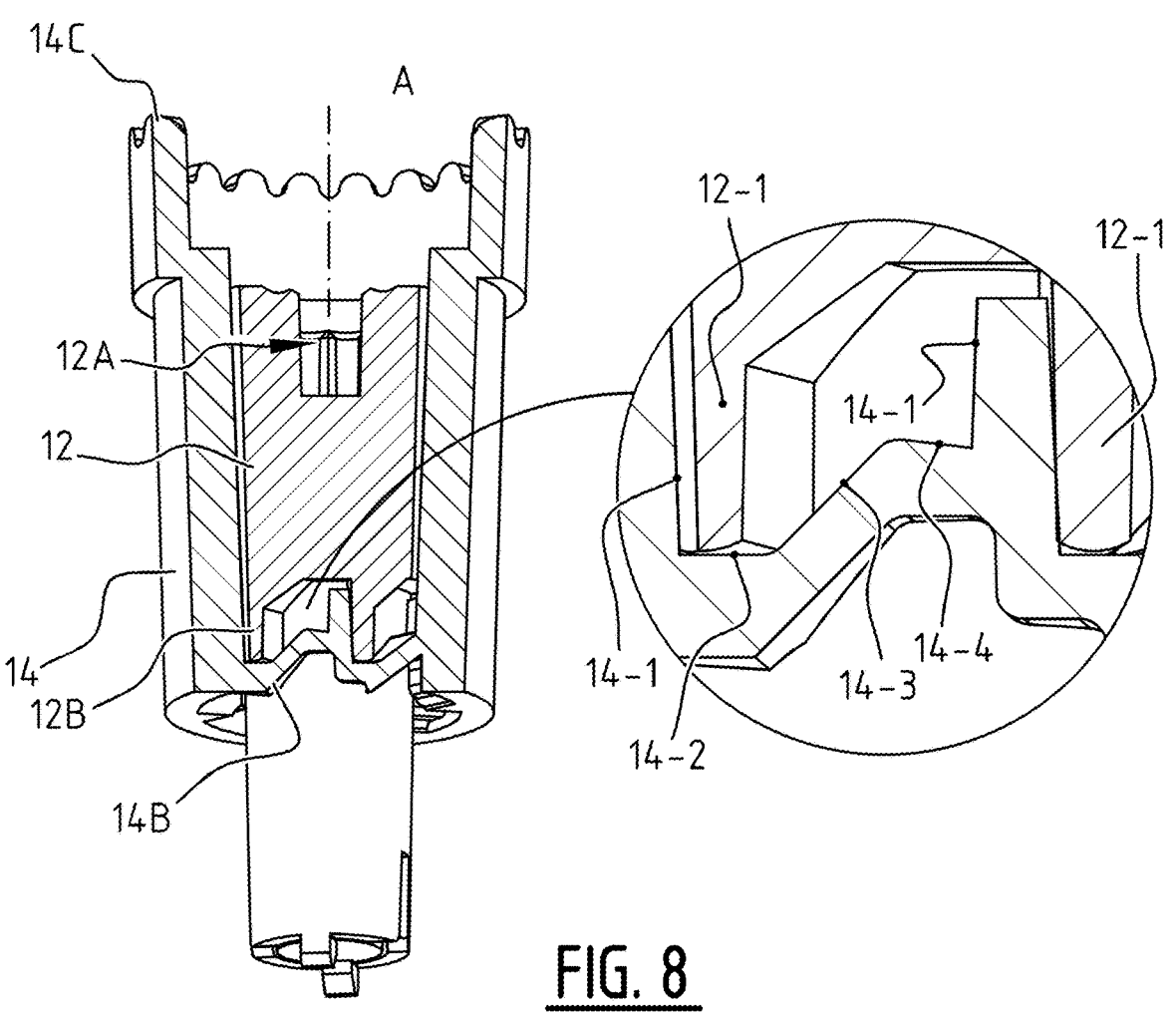
FIG. 8
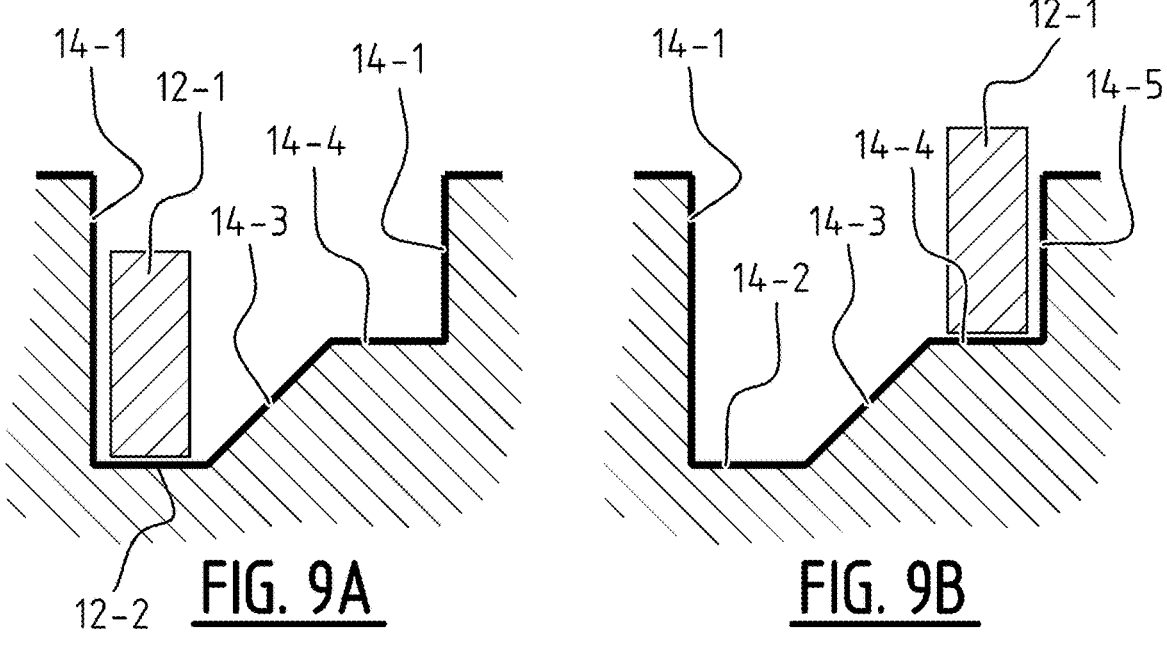
FIG. 9A                    FIG. 9B

50

USER INPUT UNIT

FIELD OF THE INVENTION

The invention relates to a user input unit. The invention further relates to a user input device, such as a keyboard, comprising such a user input unit.

BACKGROUND

Keyboards are well known in the art. They are generally flat or slab-shaped user input devices and, for use, are arranged on an approximately horizontal surface such as a table or desk. Keys of the keyboard are on top, facing upward. Keys, which are user input units, allow for the user to provide input by depressing the key. The user input device can accordingly register the depression, i.e. the key press, during which a button is moved down and then up.

Traditionally, depressible keys were provided with physical switches, which closed or opened a circuit depending on their depression. The user input device registered the depression by interrogating the circuit, leading to a binary read-out, i.e. the key was "pressed" or "not-pressed" (the latter also being called released).

Some improvements have been made recently, by employing analog sensor technology. In short, the key depression is measured over an entire depression range by a sensor, and the degree of depression is converted to a digital signal which can be operated upon. This made it possible to for instance choose a custom actuation point, i.e. the threshold at which degree of depression the key is considered "pressed" or "not-pressed" can be changed over time for a specific key, or could vary from key to key without requiring different hardware.

At the same time, some effort has been made to make keyboards more versatile, by allowing replacement and interchanging of depressible keys. For this purpose, the base of the keyboard comprises sensors arranged near slots. A key itself is made up of a "switch", which can be placed in one of the slots. Key caps can be put on such switches, to indicate the function of that particular key, and to provide desirable ergonomics or aesthetics. Such switches do no langer actually perform a switching function—they typically do not close or open a circuit. Instead, switches provide a measurable movement for the sensors in the base. They are however still referred to in the art as switches. Nevertheless, switches are of importance for providing e.g. mechanical feedback and/or an audible response. Switches are also often responsible for biasing the key upwards, i.e. to the non-pressed position. The same bias gives some a restoring force when depressing, which is experienced by a user.

Despite these efforts, the way user input can be given to a keyboard has remained limited, as depression is still the only detectable operation.

Keyboard with auxiliary—and alternative type input units are also known. Auxiliary input units usually perform any one of a limited number of dedicated functions, for example controlling volume, scrolling, cursor movement, etc. For this purpose, auxiliary input units may be operable in some way other than being depressible. As an example, some keyboards are provided with rotating knobs, binary switches, trackpads, sticks, etc. These auxiliary input units require type-specific hardware, and are therefore arranged in a fixed place, often on the periphery of the regular set of keys. This configuration typically results in rather bulky designs of the base, which needs to be able to receive the regular set in addition to the auxiliary input unit. Moreover, auxiliary keys are not detachable, and cannot be placed according to the users preference due to their reliance on said type-specific hardware.

The goal of the invention is to overcome at least partially one or more of these shortcomings.

SUMMARY

The aforementioned goal is achieved in a user input unit comprising a housing configured to be attached to a base of a user input device, such as a keyboard, a first movable element coupled to the housing, the first movable element being movable along a first direction, a user operable second movable element coupled to the housing, the second movable element being movable along a second direction, the second direction being different from the first direction, and a transmission configured to transfer movement of the second movable element along the second direction into movement of the first movable element along the first direction.

A base of a user input device is typically provided with sensors capable of registering key presses, which consist of a linear displacement of a key in a first direction. Such bases are therefore not capable of registering other movements, i.e. in a second direction. According to the invention, the user input unit can be attached to a base via its housing. It comprises a first movable element, which is movable in the first direction, so that unmodified bases can sense movement of the first movable element in that first direction. The base therefore may not require modification to be able to receive or cooperate with the user input unit.

To provide for additional functionality, i.e. beyond allowing depression of a key only, the user input unit comprises a user operable second movable element, which is movable in a different direction, called the second direction herein. Accordingly, a user can now operate the user input unit differently from the currently known keys, which allow depression only.

In order to translate user input in the second direction to movement in the first direction, the user input unit is provided with a transmission. Due to the transmission, movement applied by the user in the second direction is translated to movement of the first movable element in the first direction, so that an unmodified base may be able to effectively respond to movement in the second direction, by virtue of it being converted to movement in the first direction for the base to sense.

Accordingly, a user input unit is obtained that offers input functionality different from that of a depressible key, but which can nonetheless be used with a base capable of sensing movement in the first direction only. As a result, the user input element may present a very versatile way of providing input to an possibly unmodified base. As an example, the user input element could be a knob, a slider, a switch, etc.

In particular, the housing of the user input unit could be configured, advantageously, similar to housings of depressible keys. Accordingly, a user input unit is obtained which can be placed in multiple positions around the base, as is preferred by a user. The user input unit can accordingly be replaced by, or can itself replace, a depressible key.

Since the conversion from second direction movement to first direction movement takes place within the user input unit, the base may be agnostic of the exact configuration and design of the user input unit. The base may therefore not require modification, and may suitable provide only sensors for movement in the first direction.

Additionally, the user input unit may be detachable and (re)attachable to the base, to allow positioning it elsewhere on the base, or to allow exchanging it with different input units, such as depressible keys or other user input units.

It is noted at this point, but explained in more detail later, that the user input unit may have housing that corresponds to the collection of housings of multiple regular depressible keys.

In particular wherein the first direction is a straight direction, the second direction is a rotation direction. In such a case, the user input device may constitute a rotatable knob, that can be easily exchanged with depressible keys, and requires no knob-specific hardware. Knobs may be used advantageously to quickly change e.g. volume settings, brightness settings, sensitivity parameters, etc.

It is noted that a rotatable knob may still be depressible. In that case, it is advantageous if the transmission also couples depression of the knob to depression of the first movable element. In more general terms, the transmission may additionally couple movement of the user operable second movable element in the first direction to movement of the first movable element in the first direction.

In particular, the first direction is substantially parallel and optionally coincident to a rotational axis defined by the second direction. This allows for a knob that is rotatable in the horizontal plane when the first direction is substantially vertical. Such a knob can be ergonomically operated and/or may be easily accessible.

If the first direction is a straight direction however, the second direction may also be a straight direction, not parallel and preferably substantially perpendicular to the first direction.

In such a case, it is possible to make the user input unit a slider. In this case the user operable second movable element may be slid back and forth, and the first movable element may be moved up and down correspondingly via the transmission. Accordingly, a slider can be fitted to a keyboard otherwise suitable only for depressible keys, since the keyboard would be able to detect vertical movement only.

It is particularly advantageous if the transmission is configured to convert unidirectional movement of the second movable element along the second direction to a reciprocating movement of the first movable element along the first direction.

In this way, a very large range of movement in the second direction can be registered even if a relatively small range of motion is available in the first direction. In one extreme, if the second direction is rotational, the range of motion may be infinite, i.e. the rotation may be repeated over and over. However, the reciprocating movement of the first movable element still makes it possible to register the continued movement of the second movable element.

The reciprocating movement may also be perceived by a user as a clicking sensation, thereby providing mechanical feedback to the user.

Even more advantageously, the transmission is configured to convert a clockwise rotation of the second movable element to a reciprocating movement of the first movable element, along the first direction around a first average position and a counterclockwise rotation of the second movable element to a reciprocating movement of the first movable element along the first direction, around a second average position, different from the first average position.

In this way, from the position of the average around which the reciprocating movement takes place, it can be inferred in which direction the second movable element is being operated.

It is possible to create a suitable reciprocating movement if the transmission comprises a rack and a cam, wherein the cam is configured to follow the surface of the rack upon movement of the second movable element.

In this case the rack would force the cam to move in the first direction as it travels the along the rack.

The different average positions can be achieved if the transmission comprises a track and a follower configured to follow said track, wherein a first end of the track is located at a different position along the first direction than a second, opposite end of the track, so that a movement of the follower from the first end to the second end of the track causes the follower to move in the first direction.

In this case, operation of the second movable element in the second direction would force the follower to travers along the track, thereby causing it to move up or down in the first direction, so as to create an "offset" around which the reciprocation can take place. Of course this can also be applied without reciprocating, e.g. with some other type of motion.

In general therefore, it may suffice if the transmission includes a track and a follower configured to follow the track, wherein movement of the second movable element causes the follower to move along the track. The track at the same time can run along its length in different positions (e.g. heights) in the first direction, so that the follower is forced to move in the first direction whilst following the track. In this manner, the transmission can convert movement between the two movement directions.

The track may be discrete, offering separate positions in the first direction, or may be smooth.

If movement along of the cam is limited, for instance using stops at e.g. the ends of the track, operation beyond the limited movement of the cam can be used to cause e.g. reciprocating movement of the first movable element in the first direction. In this way, the transmission may provide unique outputs depending on the direction in which the second movable element is operated.

Further examples of a track and cam are possible. In particular, the track could define indentations along it, which thus define a discrete track. Such a discrete track, be it with indentations or otherwise, may have the added advantage of directly providing mechanical feedback to a user.

In one such an embodiment, the transmission comprises plurality of indentations with varying depths in the first direction and a at least one peg, wherein each indentation corresponds to an angular position of the second moveable element and wherein the peg is configured to, depending on the position of the second moveable element, be arranged in the corresponding indentation.

Since the indentations vary in depth, the peg(s) protrude into the indentations to different extents, which can be used to infer information on the position or movement of second movable element.

The user input unit may even comprise multiple such pegs, for instance three or four. In such a case it may be relatively easy to uniquely determine the rotational position of the second movable element. More accuracy can indeed be obtained by registering the movement of each of the multiple pegs, for instance by coupling each of them with a respective switch.

Such a design has the further advantage that the user input unit can cover multiple key slots in a keyboard, and can therefore be of a larger size than would otherwise be possible.

It is noted that the pegs may be constituted by the first movable element. It is therefore in principle possible that the transmission is comprised by the combination of the second movable element and the first movable element, granted that their interaction allows for the described transmission. The transmission thus need not be a separate physical component. Rather, the transmission may arise from the interaction of various components, additional to or made up solely by, the first and second movable elements.

The user input unit may be substantially cylindrical, thereby defining an axis A and wherein the first direction coincides with or runs along the axis A.

As mentioned before, it is advantageous if the transmission is further configured to transfer movement of the second movable element along the first direction to movement of the first movable element along the first direction. In this embodiment, the second movable element can also be operated by depressing it.

The second movable element may be a knob, to facilitate operation by rotation. Depression of the knob, if desired, may be made possible if the user operable second movable element is further coupled to the housing movably along the first direction.

It is also possible to allow tilting of the second movable element, e.g. around the axis of rotation A. The transmission may be configured to couple a tilting motion into motion of the first movable element in the first direction, so that also the tilting motion can be registered, preferably as a distinct operation from rotation or depression.

In such an embodiment, the user input unit exhibits joystick like behaviour, whilst at the same time making use of switches that would normally only register depression.

Movement may be registered by a suitable sensor, for instance in a user input device. To facilitate this, the first movable element may be detectable by a sensor included in the user input device. As an example, a magnet may be fixedly attached to the first movable element to allow detection of movement by sensing the magnetic field, e.g. using a Hall-sensor.

It is noted that in principle, there could be multiple first movable elements to enhance accuracy.

The goals set out above, are furthermore achieved in a user input device, such as a keyboard, comprising a base; a user input unit as mentioned above, and a sensor configured to sense a movement or a position of the first movable element along the first direction.

Application of the transmission allows for providing different types of input to the user input device, and the user input unit can either be already included with the user input unit or, by coupling the user input unit to a base, be added thereto.

Practically, the sensor is a Hall-sensor.

It is especially advantageous if the user input unit is detachable and/or (re) attachable from the base.

In such a case it if possible the user input device further comprises at least one depressible key, wherein the user input unit and the at least one depressible key are interchangeably attachable to the base at a position corresponding to the sensor.

It therefore becomes possible, for the first time, to use a single sensor which is normally configured for registering movement in the first direction only, to alternatively register operation of the second movable element in the second direction, due to the transmission as explained above.

It is even possible the user input unit is interchangeable with any single depressible key of the user input device, or with multiple such depressible keys collectively.

For interchangeability, the user input unit may be configured to connect to a switch of a user input device, e.g. a switch of a keyboard. The user input unit may thus take the place of a key cap that would otherwise be combined with the switch to create a depressible key. It is however also possible the user input unit replace the key cap and switch when interchanged.

For connecting to a switch, the user input unit may comprise one or more receiving spaces into which the switches engage, for instance form fittingly.

DRAWINGS

The present invention is further illustrated by the following figures, which show a preferred embodiment of the device according to the invention, and are not intended to limit the scope of the invention in any way, wherein:

FIG. 8 shows parts of a multi-input device according to the invention;

Figure 10:
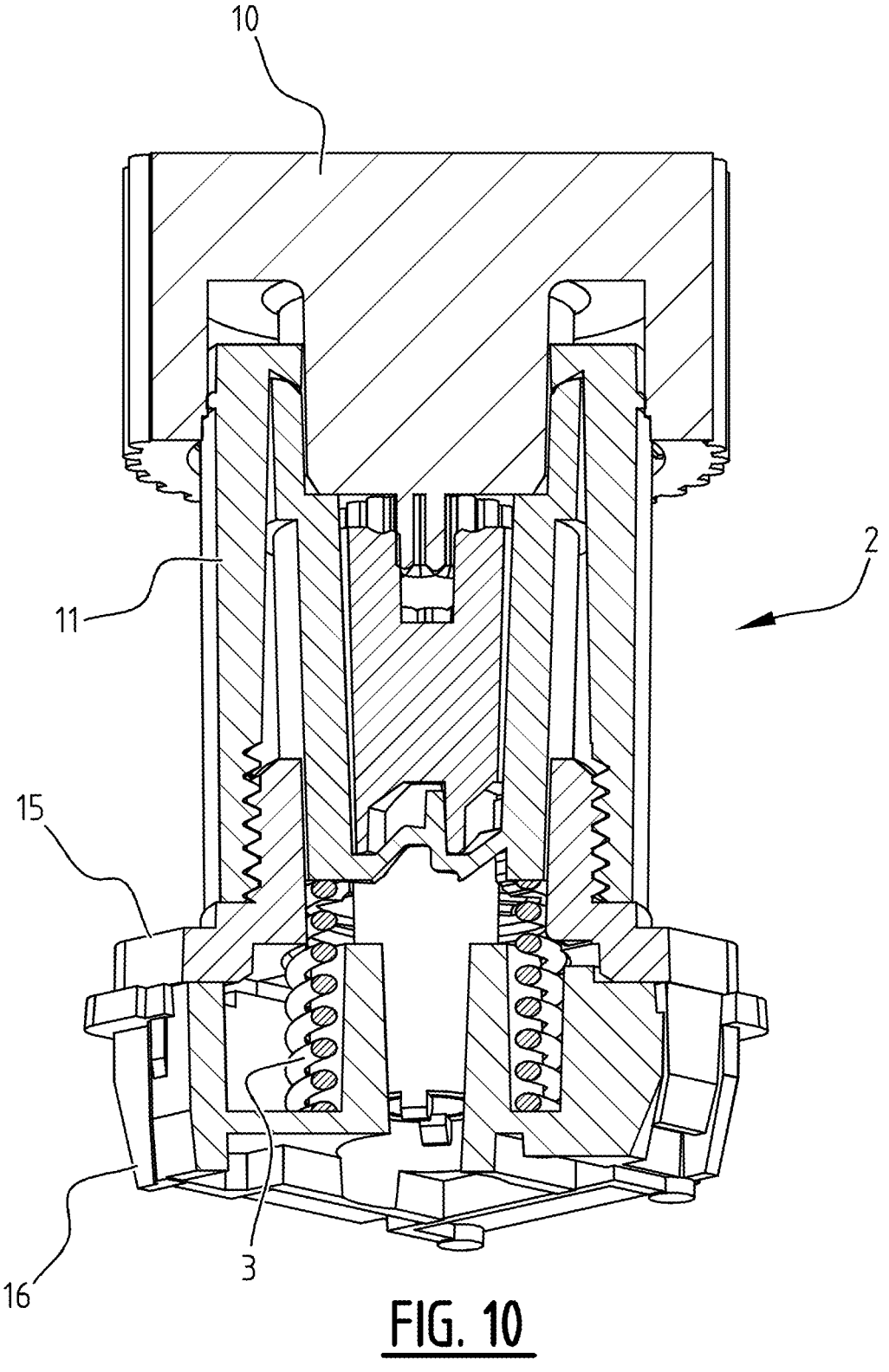
Figure 11:
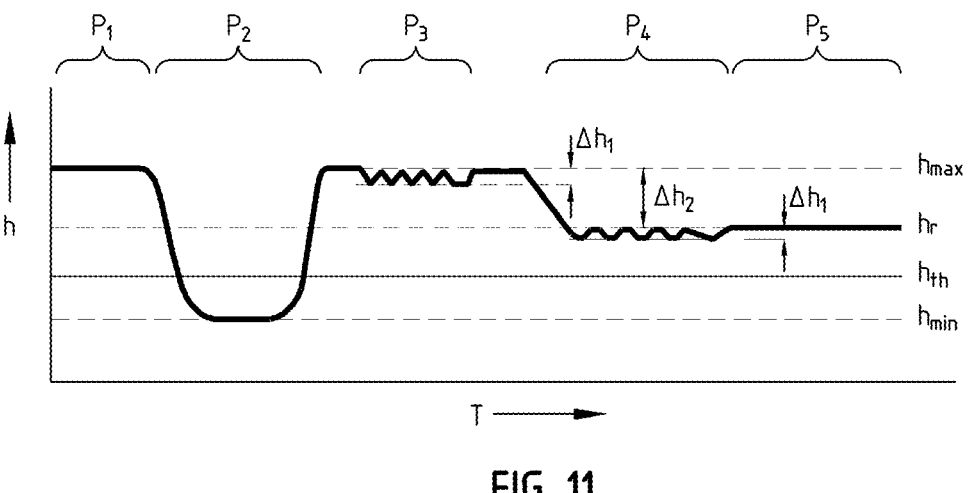

FIG. 9A-9B schematically shows two interlocking;

FIG. 10 shows a further cross-section of a multi-input device according to the invention;

FIG. 11 shows a graph of a measured height over time.

Figure 1:
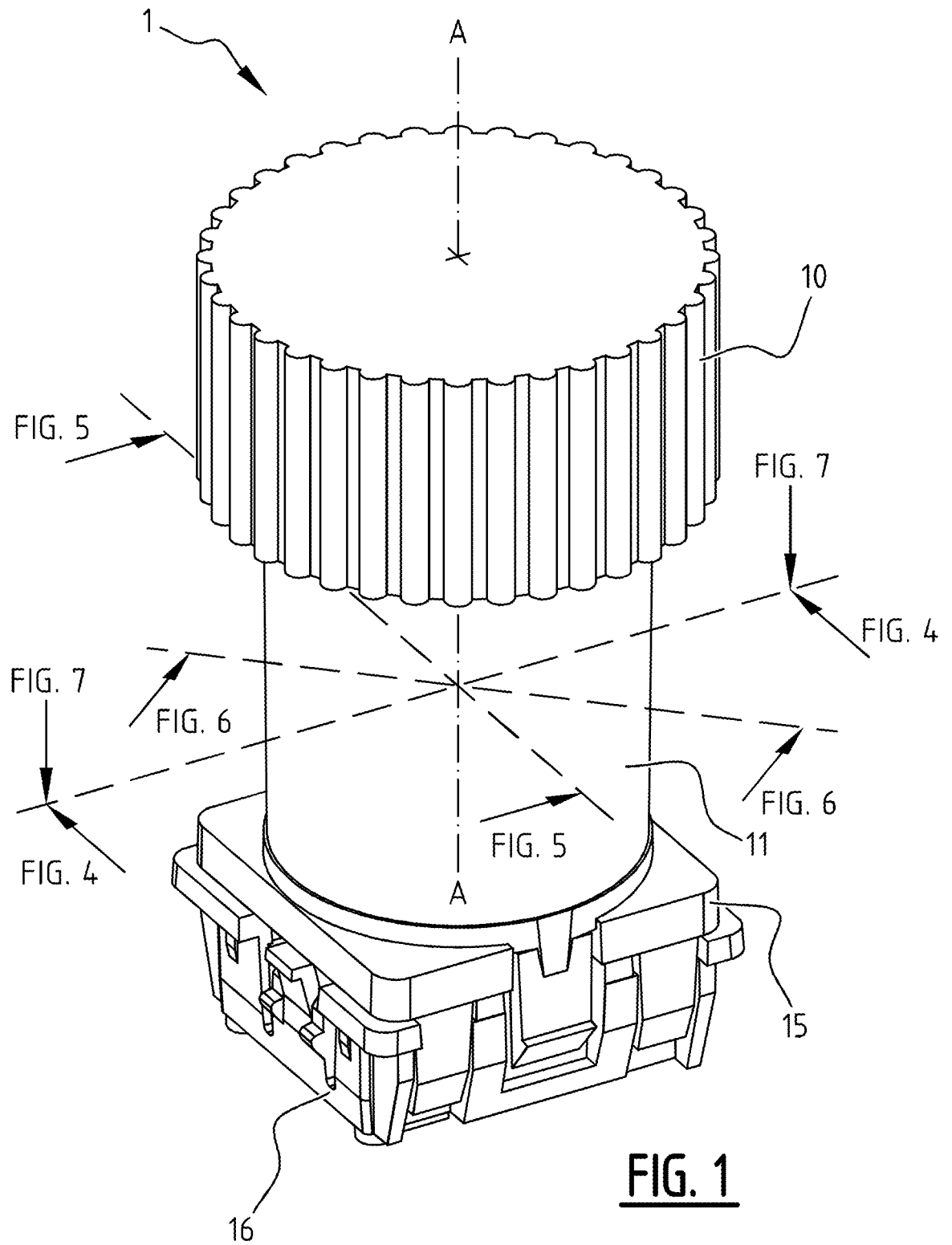
FIG. 1 shows schematically a perspective view of an embodiment of a user input unit according to the invention.
Figure 12:
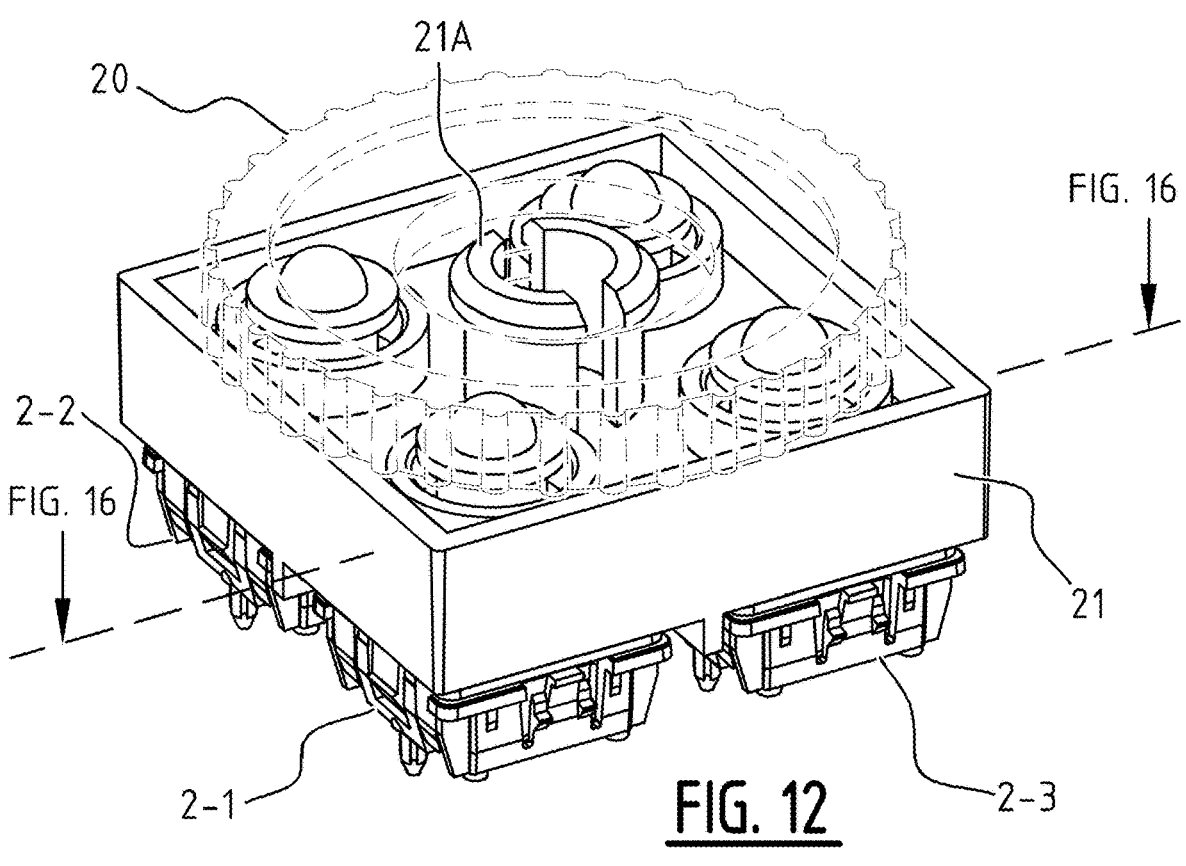
Figure 13:
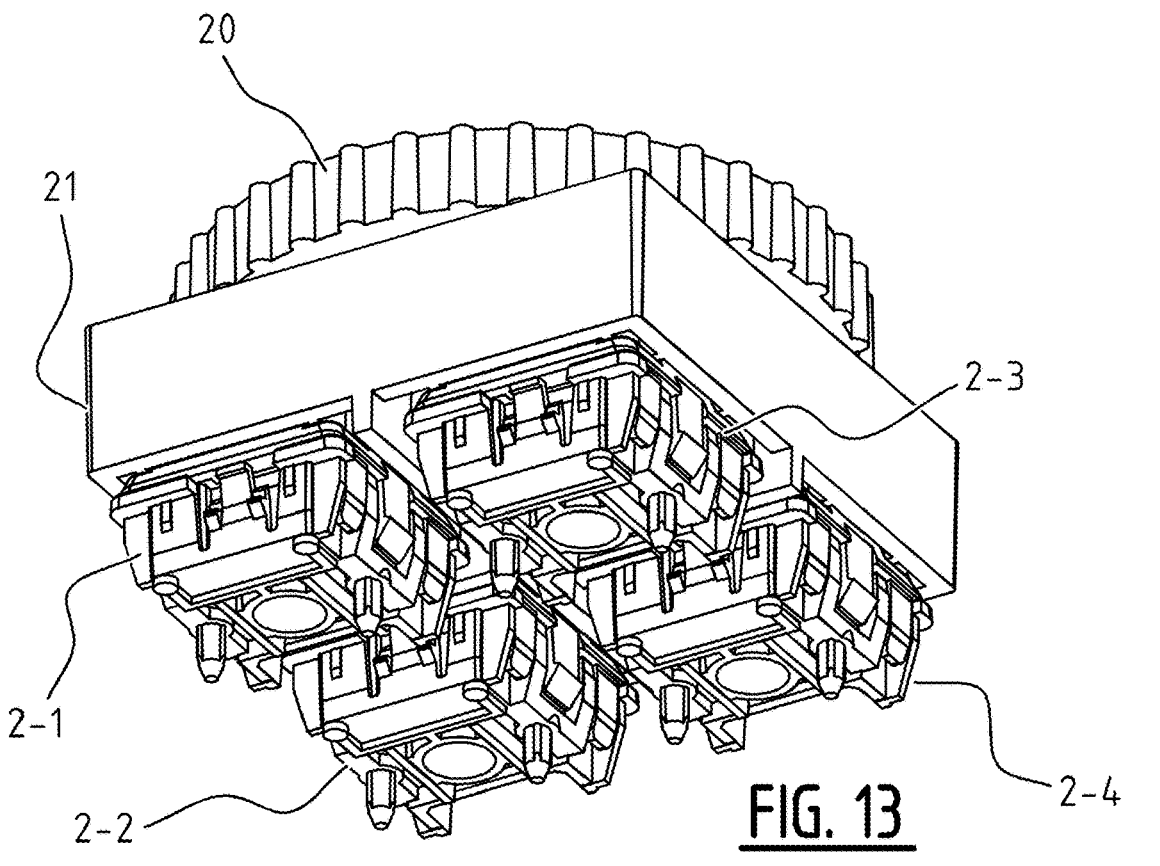
Figure 14:
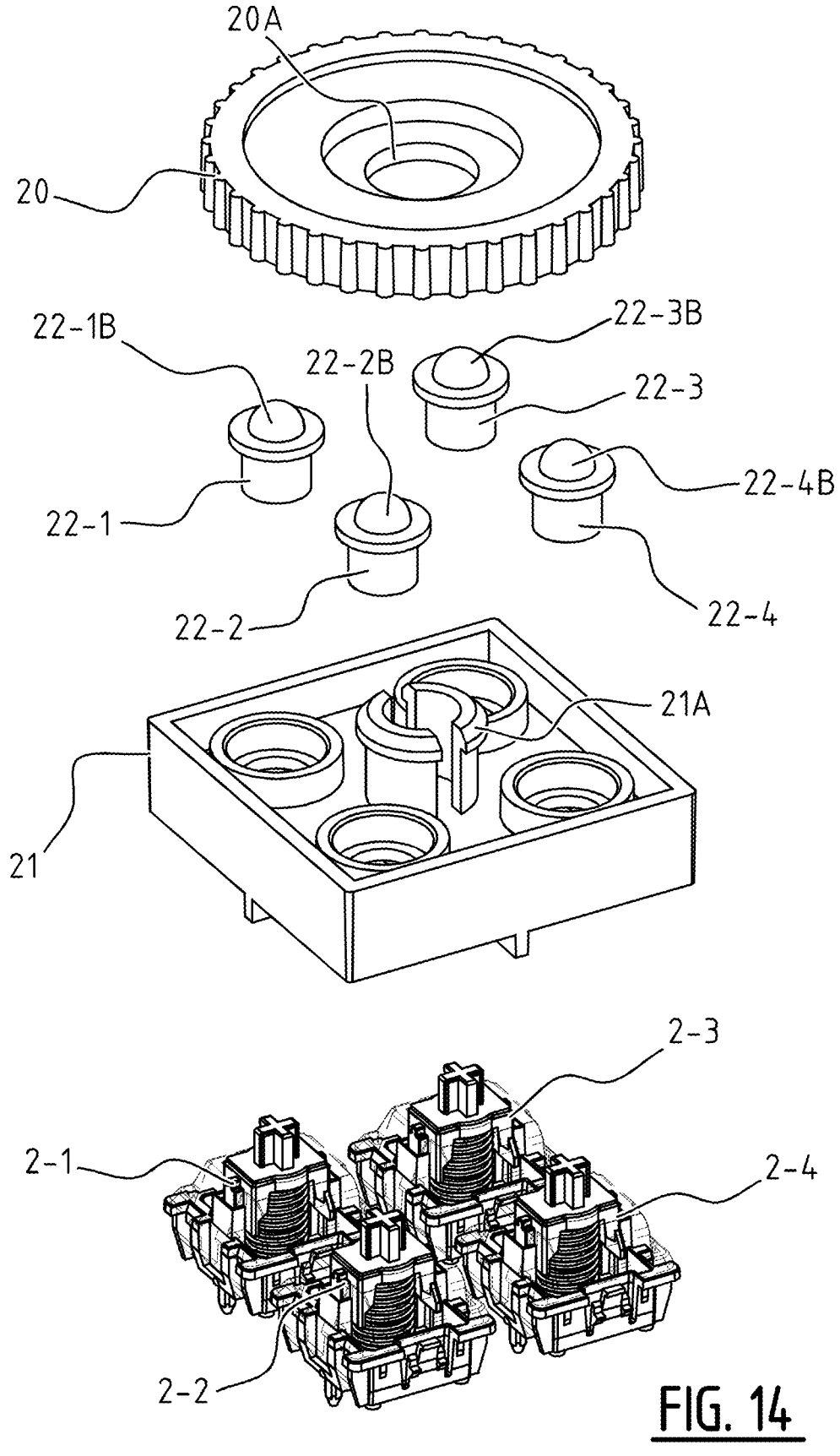
Figure 15:
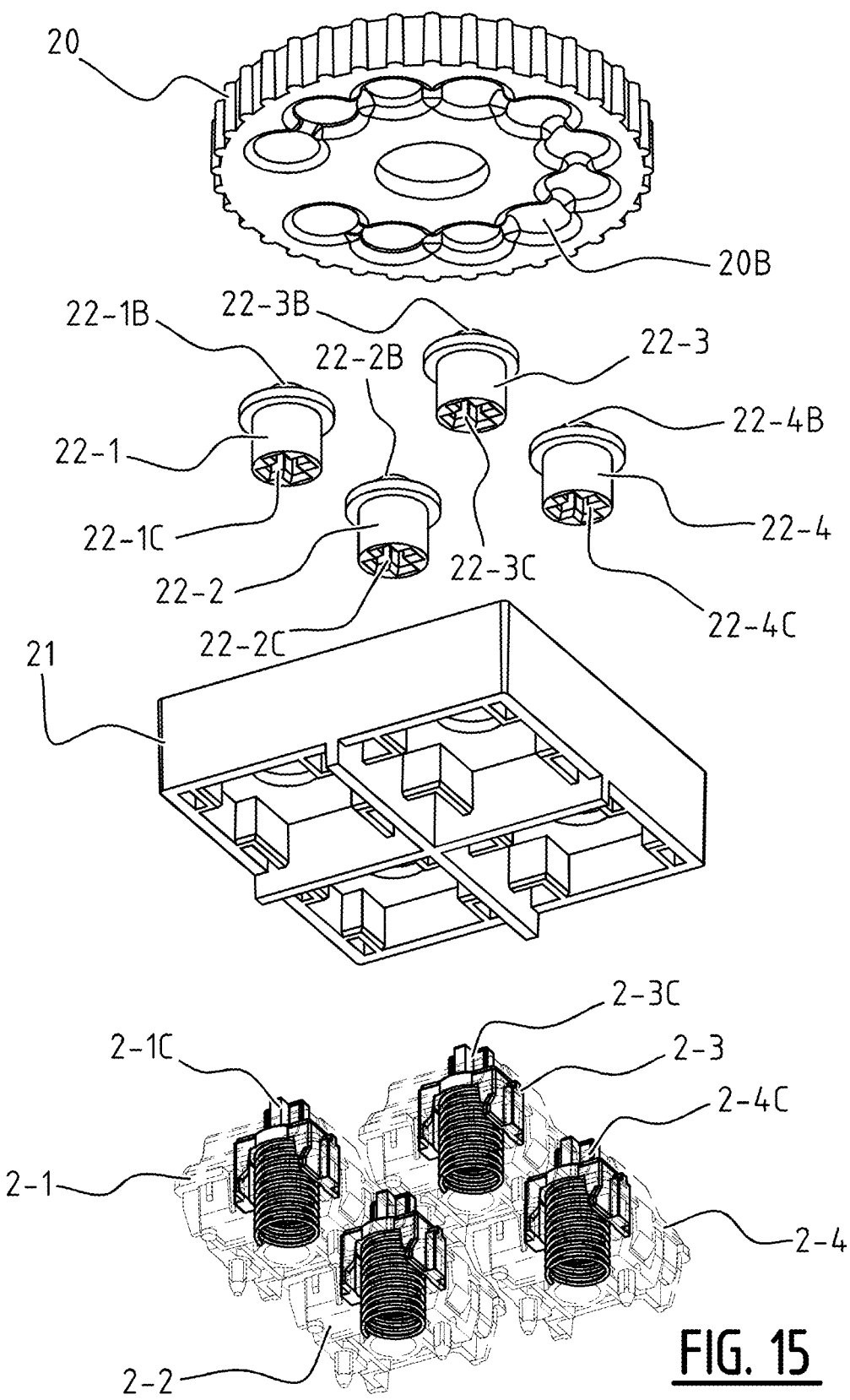
Figure 16:
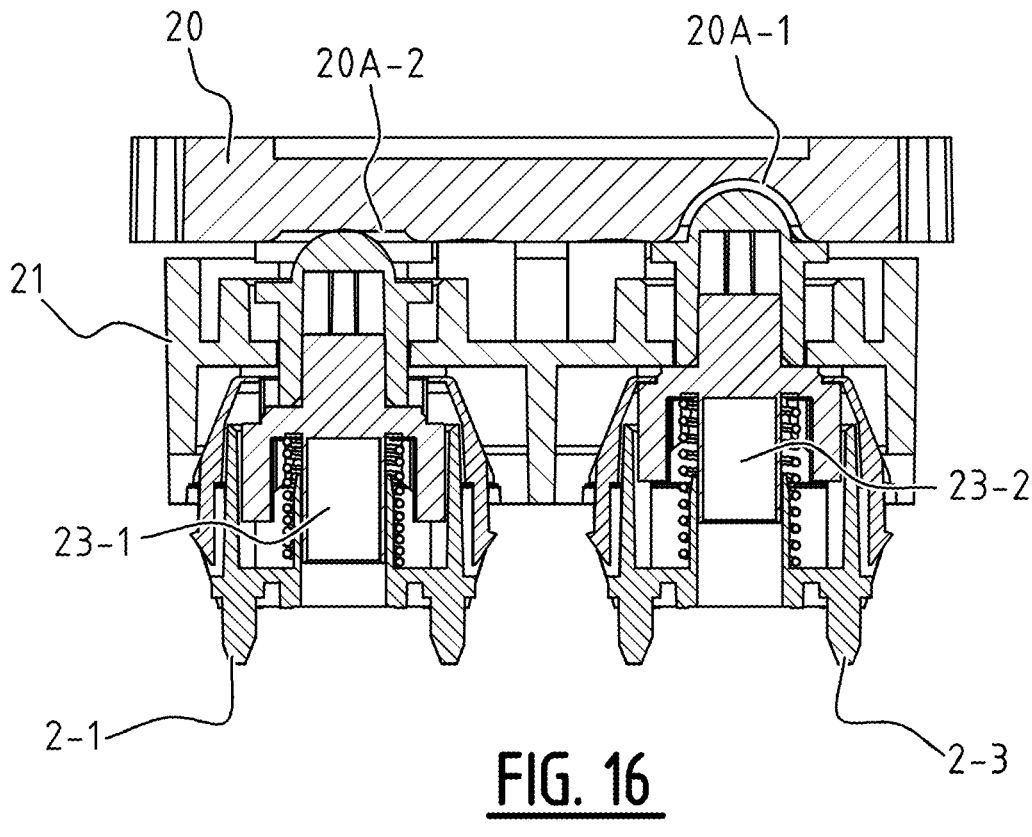
Figure 17:
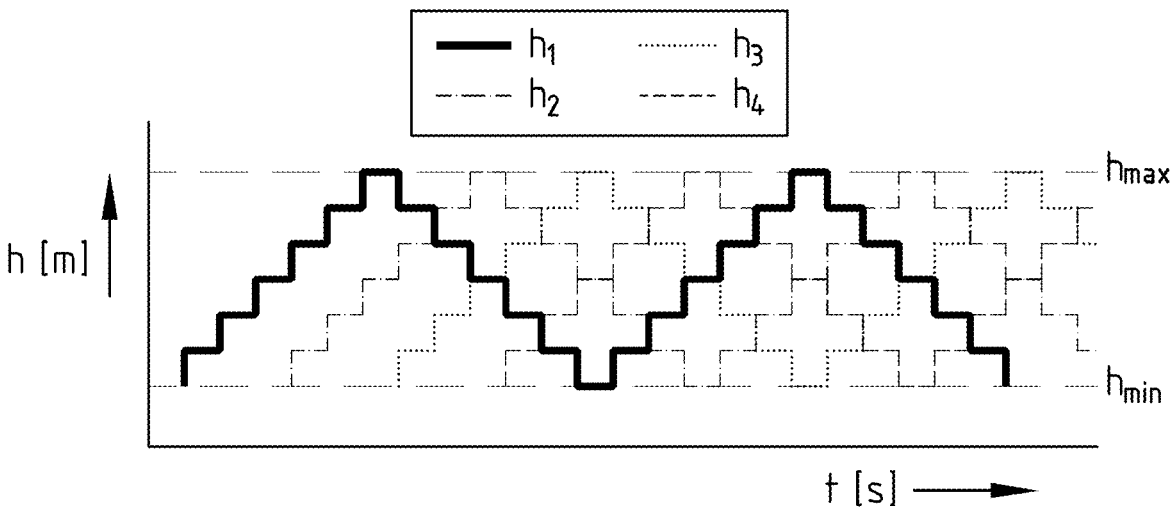
Figure 18A:
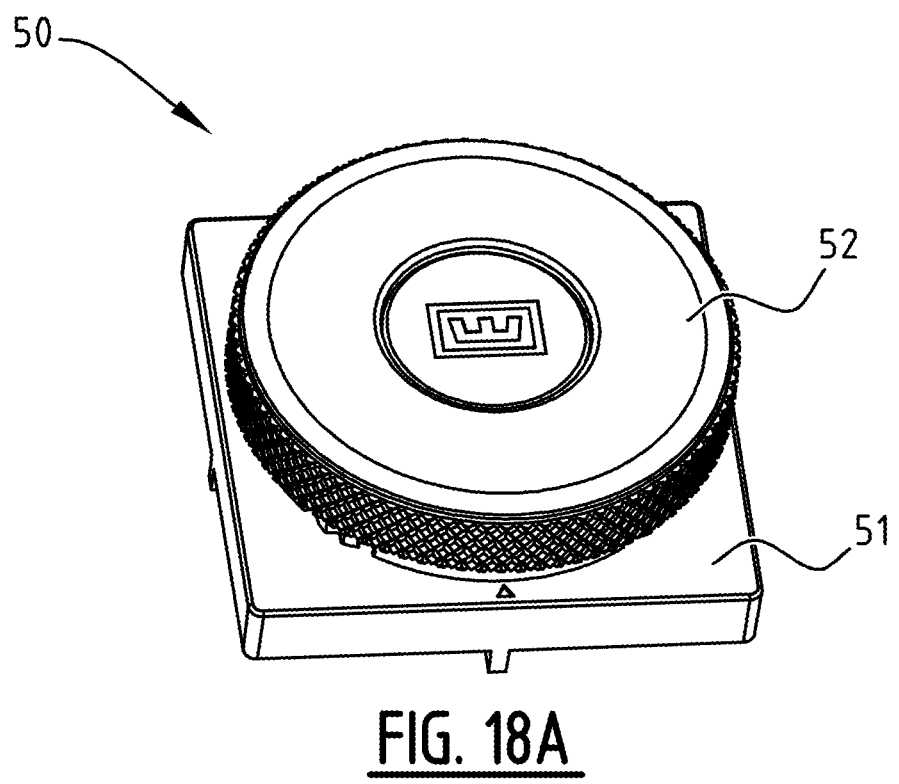
Figure 18B:
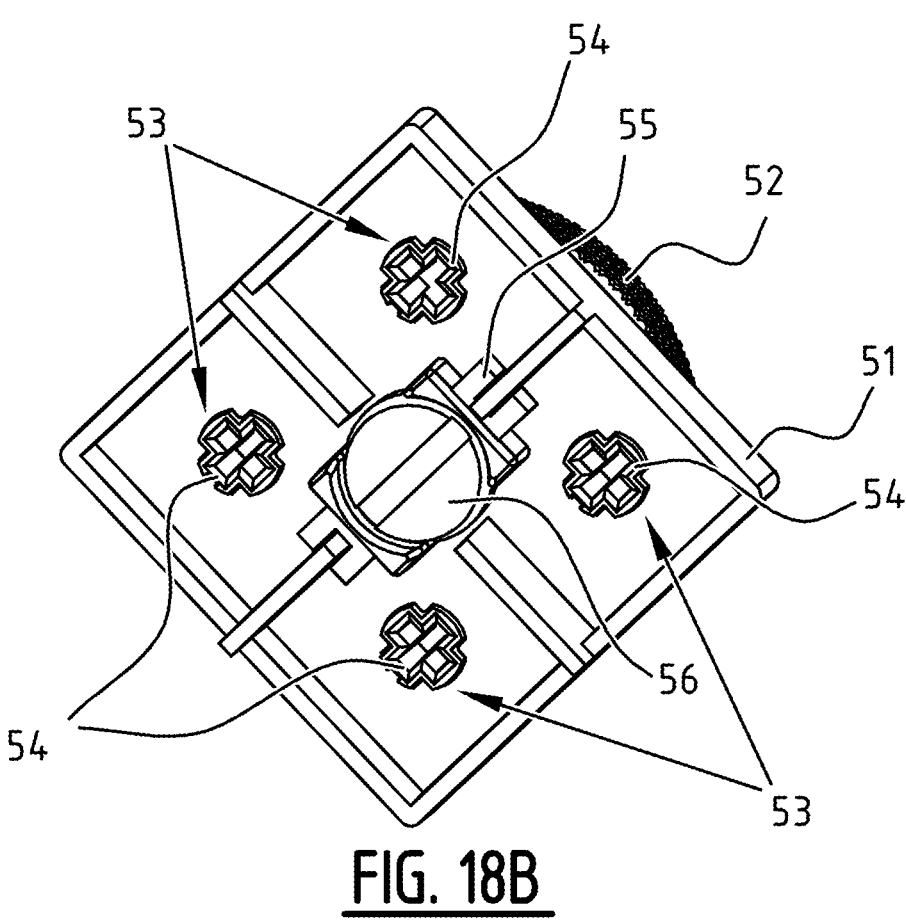
Figure 18C:
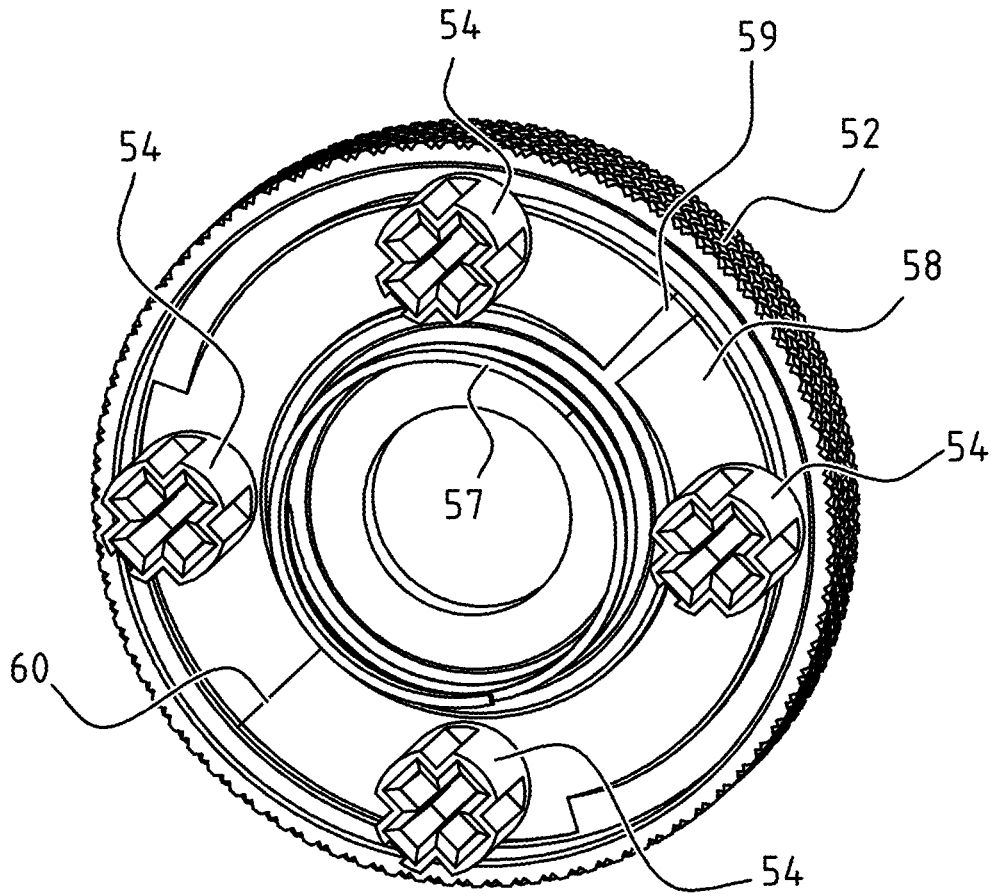

FIG. 12 shows, in an isometric perspective view, a further embodiment of a user input unit according to the invention;

FIG. 13 shows in a different view the embodiment of FIG. 12;

FIG. 14 shows an exploded view of the embodiment shown in FIGS. 12 and 13, in the isometric perspective of FIG. 12;

FIG. 15 shows the exploded view of the embodiment shown in FIGS. 12 and 13, in the isometric perspective of FIG. 13;

FIG. 16 shows a cross-section of the embodiment shown in FIGS. 12 and 13;

FIG. 17 shows a possible response generating using the embodiment shown in FIGS. 12 and 13; and FIGS. 18A-18C show perspective views of a user input unit of another embodiment. FIG. 1 shows.

DETAILED DESCRIPTION

Shown in FIG. 1 is an embodiment of a user input unit 1 according to the invention. The user input unit 1 comprises a housing 2—which in this case is a combination of housing element 11 and housing elements 15, and 16. The user input unit 1 can be attached to a base of a user input device, such as a keyboard, using the housing elements 15 and 16. The user input device is not shown herein. The skilled person however will recognize the characteristic shape of housing elements 15 and 16, which together correspond to the typical housing of switch for a depressible key. User input unit 1 has a user operable knob 10, which is a user operable input element. The knob 10 defines a centre axis A coincident with its axis of rotation. The knob 10 is rotatable around the centre axis A with respect to the housing 2. Said rotation direction will later be referred to as second direction D2. Also shown in FIG. 1 is a number of cross-sectional planes and, for each plane, the figure in which the corresponding cross-section is shown.

In the context of this application, the orientation that user input unit 1 has in FIG. 1 may be described as the upright position. The centre axis A may be described as vertical. The direction D1 indicated in FIG. 6 may be described as down or downward. The plane perpendicular to the centre axis A may be described as horizontal. The clockwise direction may be defined as clockwise when the user input unit 1 is seen from above. The direction D2 indicated in FIG. 6 may be described as clockwise.

Figure 2:
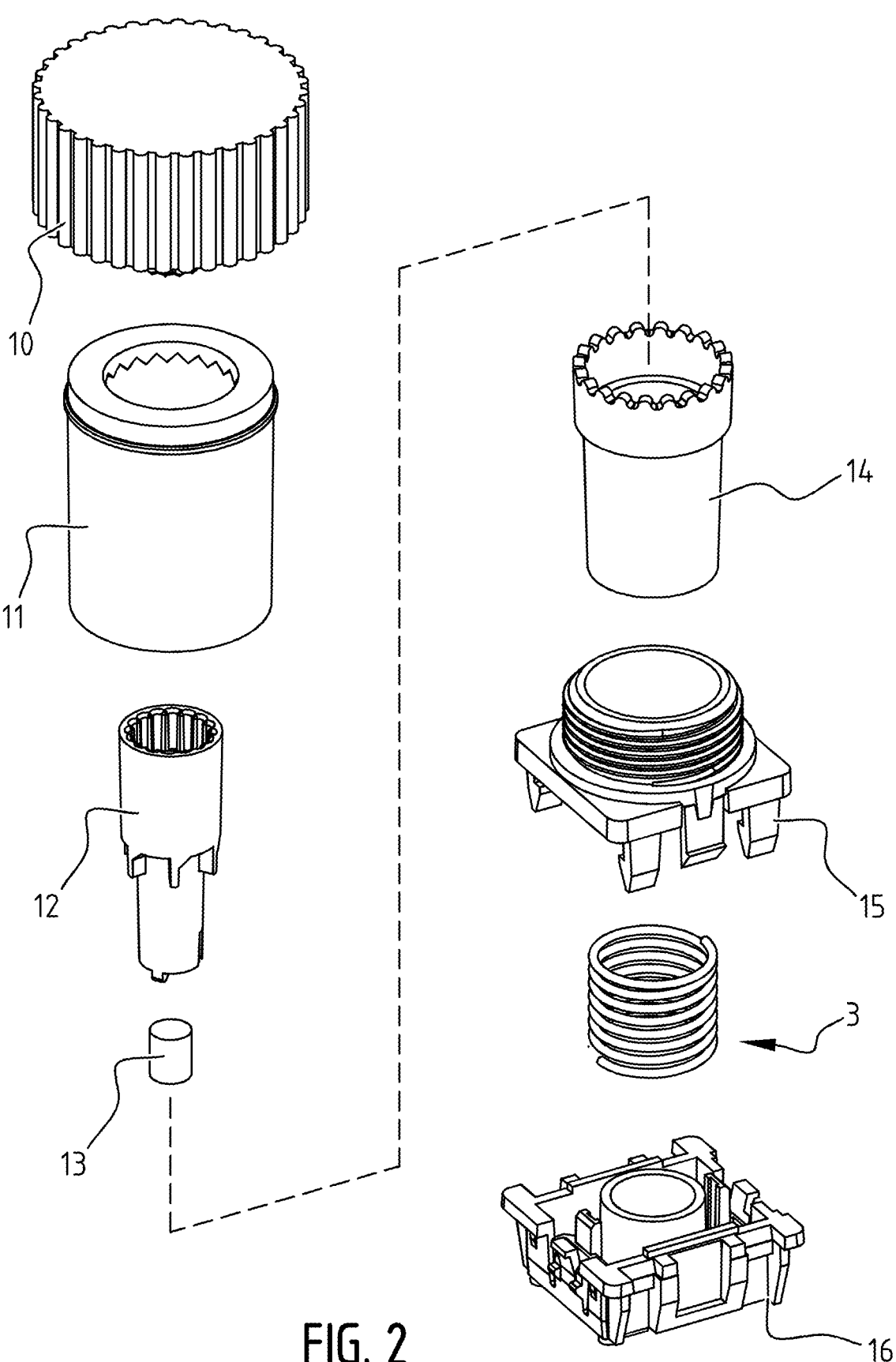
FIG. 2 shows schematically an exploded view of the embodiment in FIG. 1.
Figure 3:
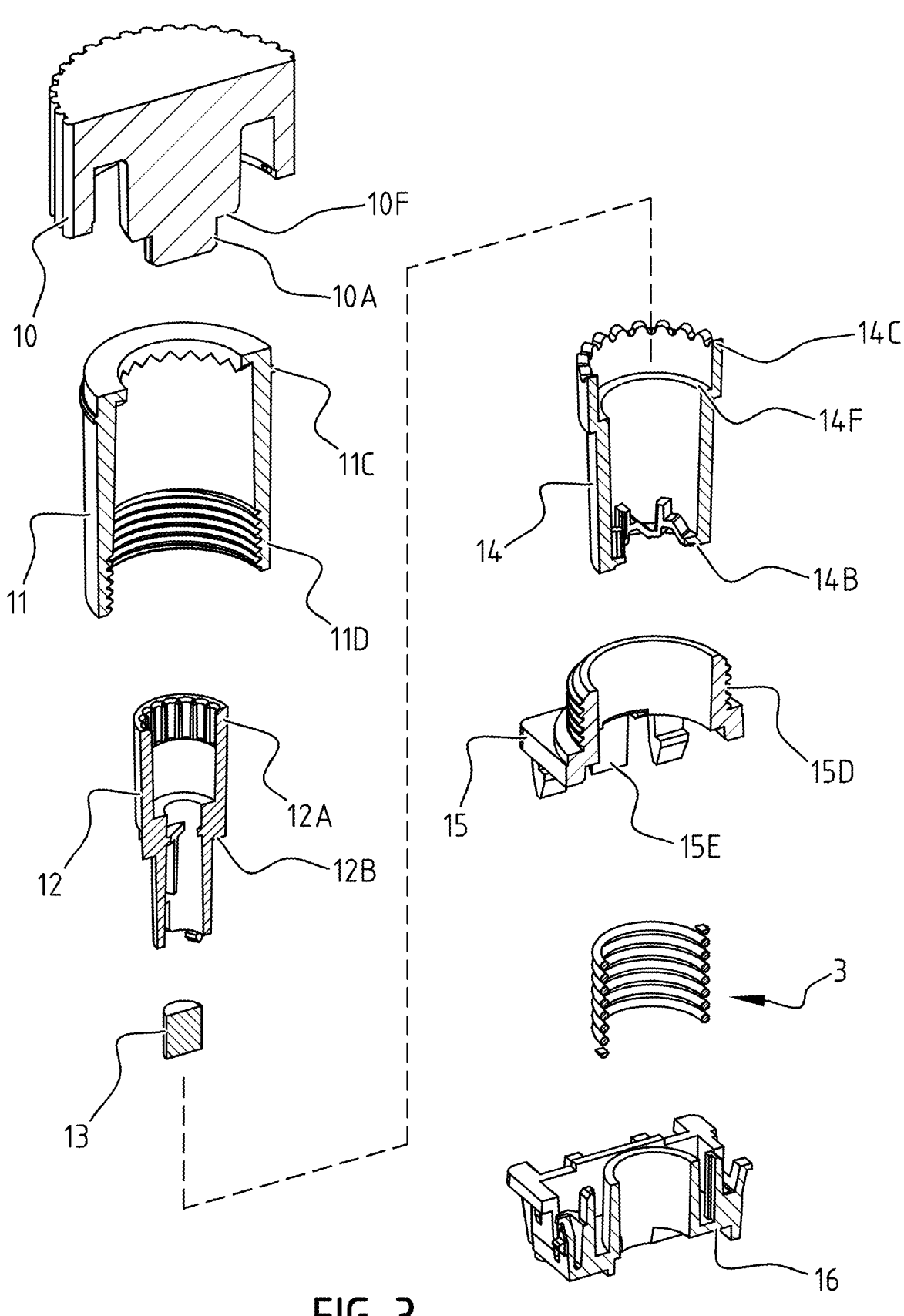
FIG. 3 shows a cross-section of the exploded view of FIG. 2.

Shown in FIG. 2 is an exploded view of an embodiment of a user input unit according to the invention. Shown in FIG. 3 is a cross-section of the exploded view of FIG. 2. User input unit 1 comprises a knob 10, a housing element 11, a second transmission element 14, a magnet 13, a first transmission element 12, and housing elements 15 and 16.

Housing element 15 comprises an outward facing threaded area 15D. Housing element 11 comprises an inward facing threaded area 11D. Housing element 11 may be screwed onto first housing element 15 in region R1 indicated in FIG. 4. Housing element 15 may be connected to housing element 16 with connecting element 15E. In this example, the connecting element 15E is part of a snap fit connection, but of course other connection techniques may be used. The screw connection between housing elements 15 and 11 is also not necessarily embodied that way, although screwing may allow to configure the height of the housing element 11 with respect to the other housing element 15.

Figure 4:
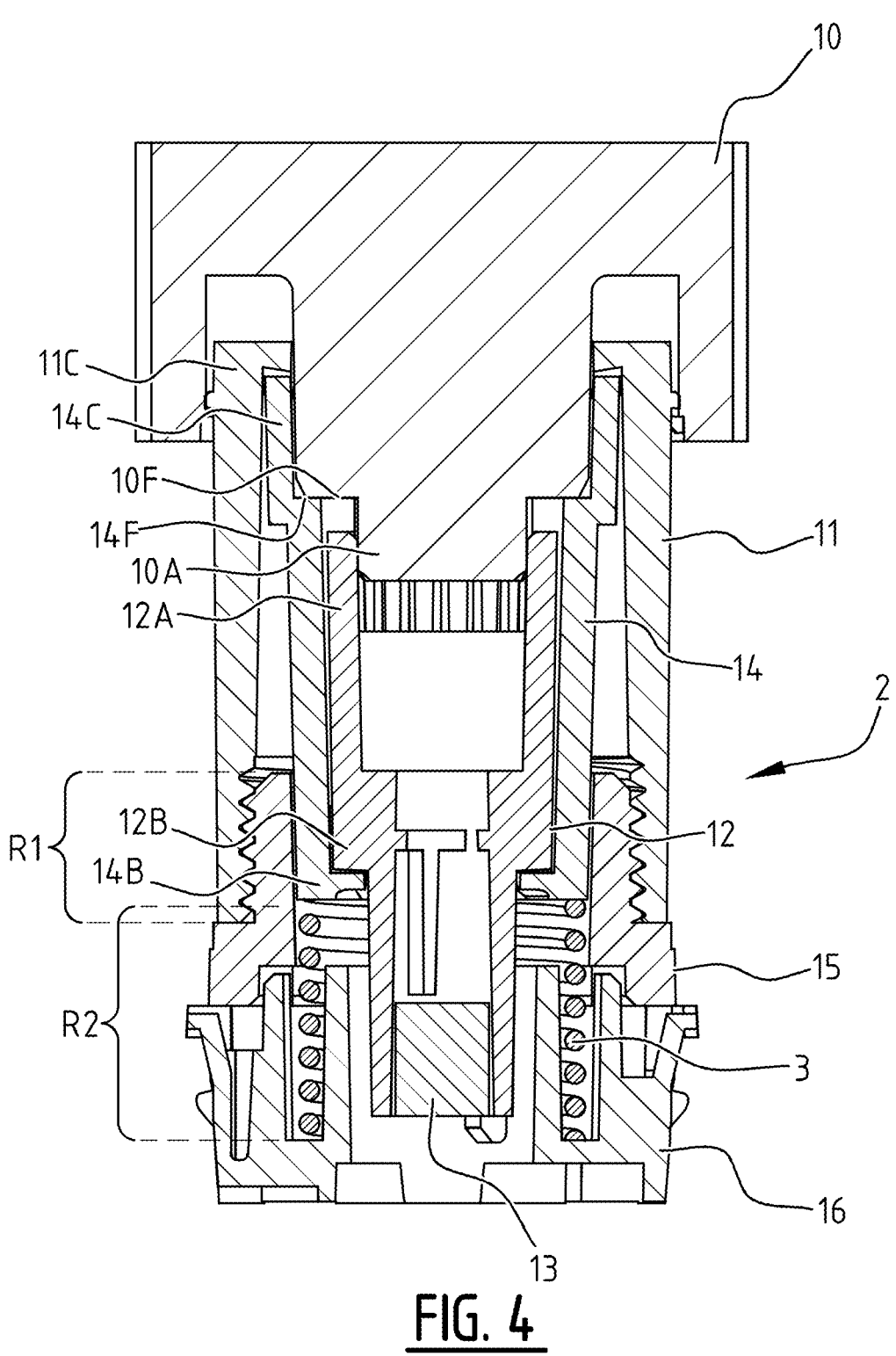
FIGS. 4-7 show various cross-sections of the embodiment along planes indicated in FIG. 1.

Spring 3 is arranged between housing element 16 and second transmission element 14 in region R2, indicated in FIG. 4. The spring biases the second transmission element 14 away from the housing element 16.

Knob 10 has a downward facing edge 10F with which it rests on an upward facing edge 14F of the second transmission element 14.

Figure 5:
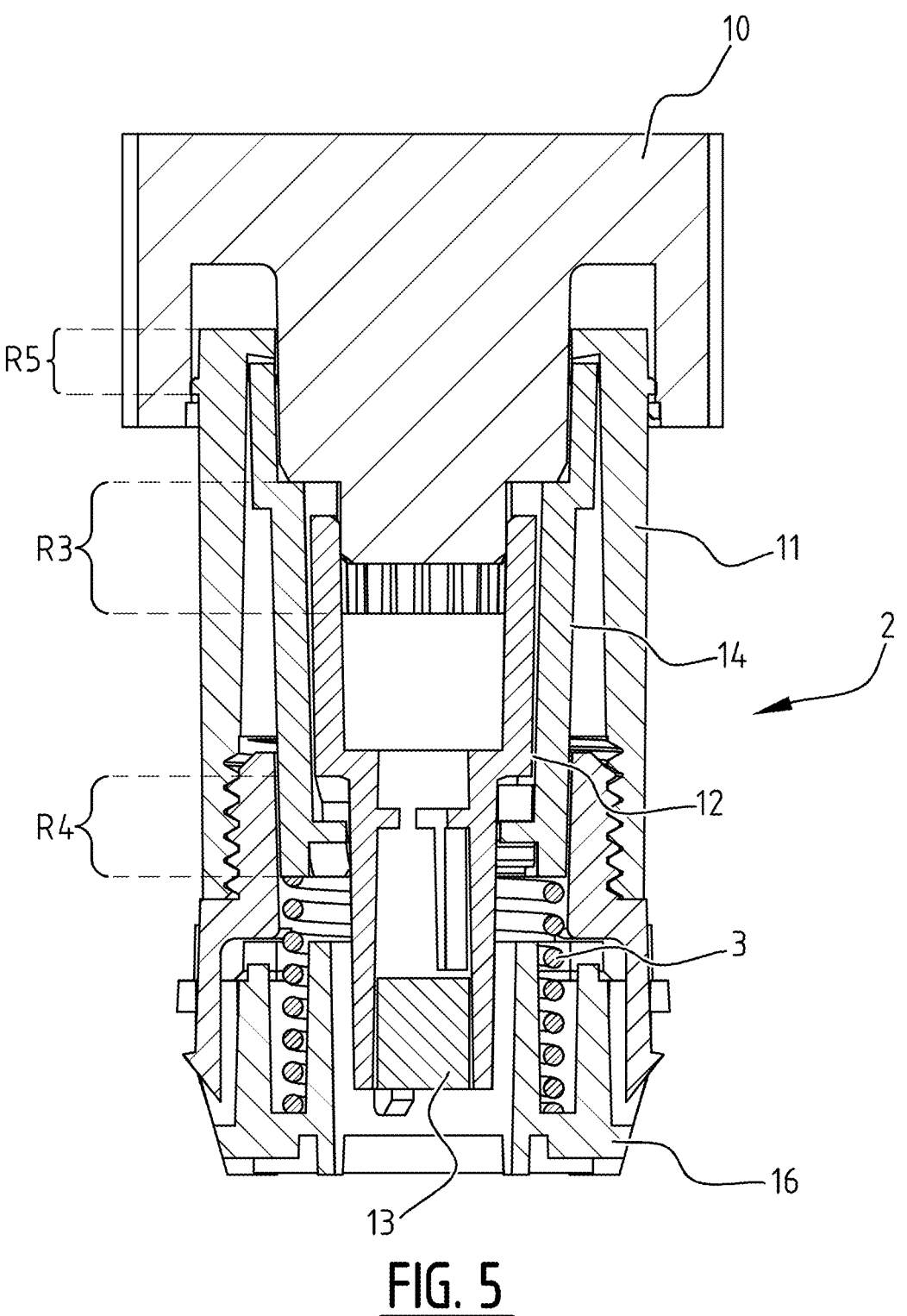

Knob 10 comprises an outward facing gear section 10A. First transmission element 12 comprises an inward facing gear section 12A. Gear section 10A interlocks with gear section 12A in region R3 indicated in FIG. 5. Accordingly, the knob 10 and the first transmission element 12 are rotatably coupled, in this example, via the gear sections 10A and 12A. Of course, other coupling techniques could be used.

It is noted that the gears 10A and 12A are of constant shape along their axial direction, so that they allow sliding of the knob 10 with respect to the first transmission element 12 along their axial directions. Whilst this may offer pleasant operation for a user, this feature is not strictly necessary, in fact the knob 10 may also be fixedly arranged with respect to the first transmission element 12 in that axial direction.

First transmission element 12 comprises a downward facing edge 12B. Second transmission element 14 comprises an inward facing ridge 14B. Edge 12B rests on and interlocks with ridge 14B in region R4 indicated in FIG. 5. Magnet 13 is fixedly attached, or otherwise held in place, to first transmission element 12. In this manner, the inward facing ridge 14B defines a track along which can be followed by the edge 12B, which therefore is a follower of that track. Of course, other embodiments of tracks and followers could be used.

Second transmission element 14 comprises, on its upper end, a toothed edge 14C, wherein the collection of teeth can be called a cam. Housing element 11 comprises, on its upper end, an inward facing ridge 11C having a downward facing toothed side, which forms a rack to interface with the cam. Toothed edge 14C may interlock with toothed ridge 11C in region R5 indicated in FIG. 5. It is noted that other examples of cam and rack could be employed instead.

Operation

User input unit 1 may receive user input and whether said user input is received, or what user input is received in particular, may be derivable from the position and/or movement of magnet 13. Specifically, this may be derived using a Hall-sensor.

For the embodiment shown in FIG. 1, a Hall-sensor (not shown) may be arranged approximately along axis A, in or below housing element 16. In themselves known from the art, Hall-sensors measure the strength of the magnetic field caused by the magnet. Typically, such a sensor is already available in a base of a user input device, such as a keyboard. The user input unit 1 is typically aligned with a dedicated sensor for that user input unit 1 when it is connected to the base with its housing elements 16, 15. When connected, the Hall-sensor can detect the field strength of the magnet 13, and the resulting signal will correspond to the height of the magnet 13 with respect to the sensor, and therefore also to the height of the first transmission element 12 with respect to the housing elements 15, 16, 11.

Figure 6:
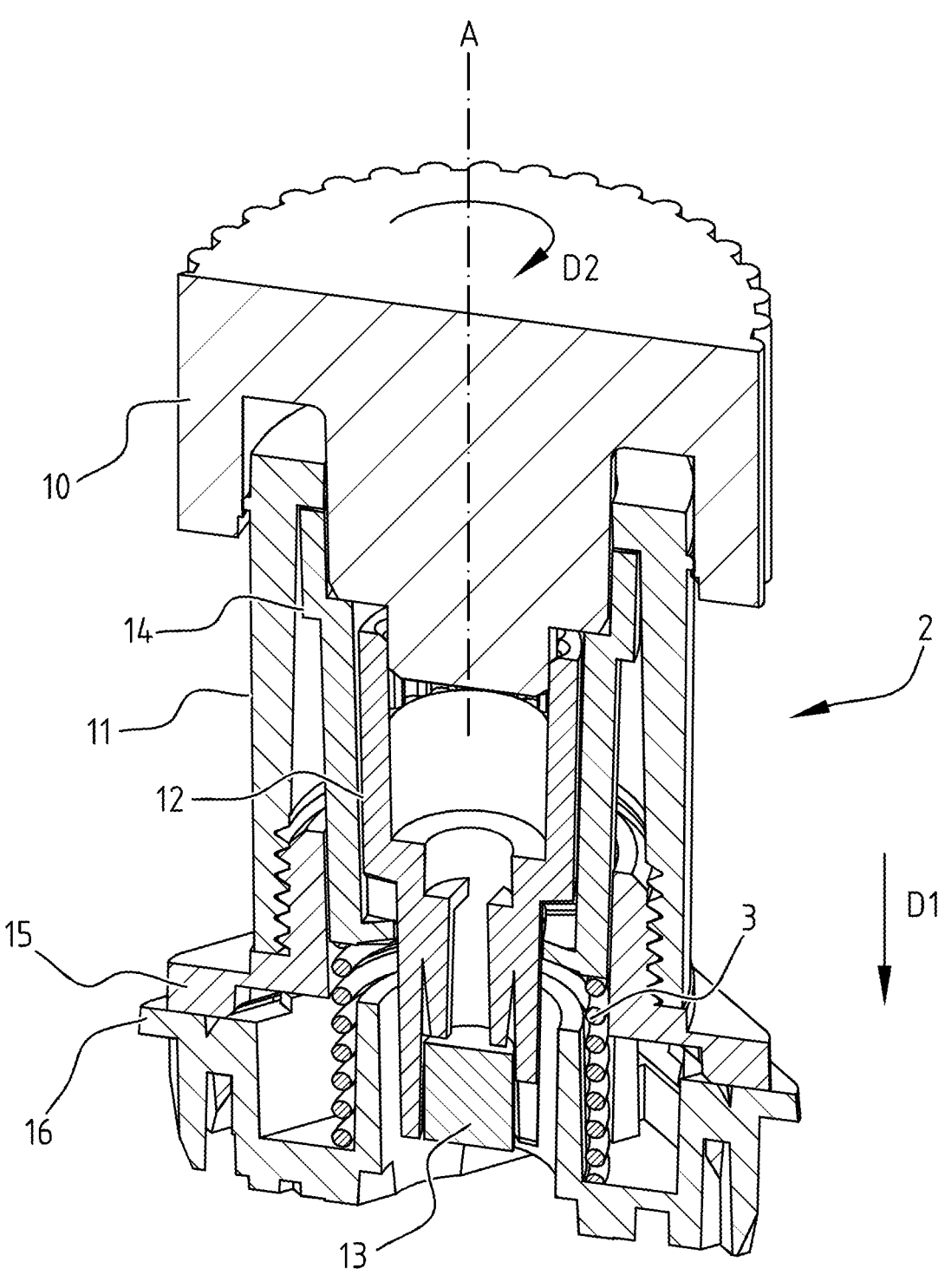
Figure 7:
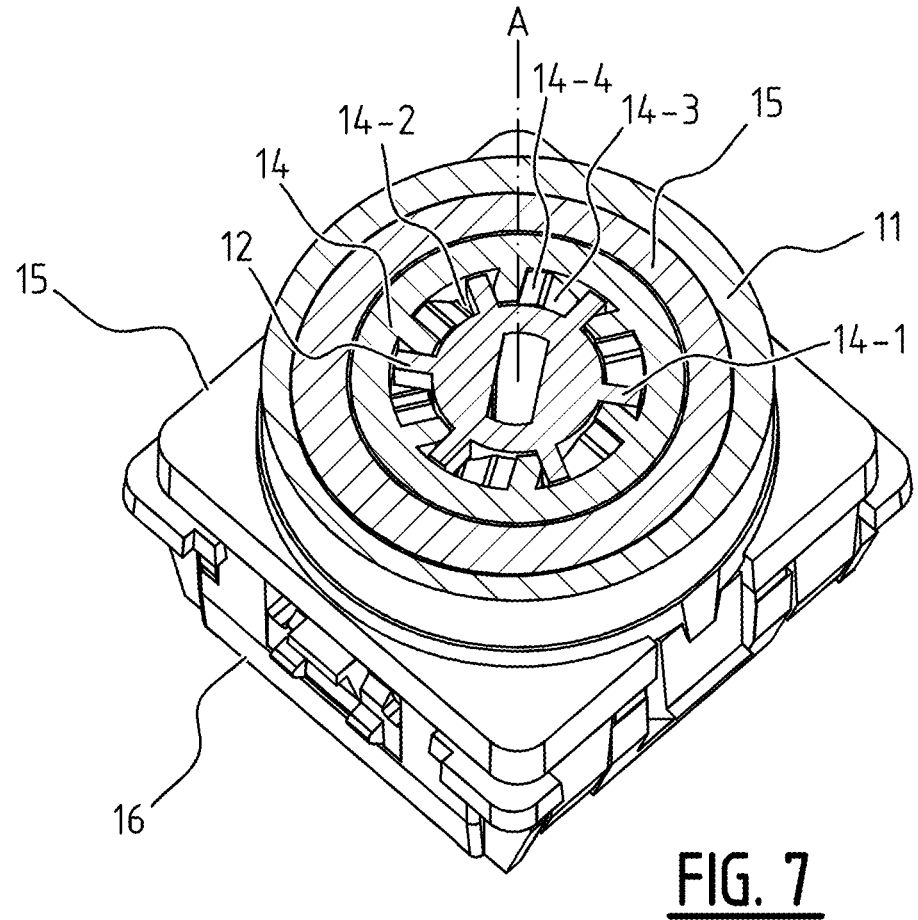

When user input unit 1 is oriented in the manner shown in FIG. 6, the Hall-sensor may be below and/or arranged in direction D1 with respect to magnet 13. Therefore, in the context of this application, it may also be said that the Hall-sensor measures the height of magnet 13.

In the following explanation, housing element 16 is considered stationary, for normally it would be connected to the base of a user input device. In the embodiment shown in FIG. 1, housing element 15 is clipped onto housing element 16 and housing element 11 is screwed onto housing element 15. Consequently, housing element 15 and housing element 11 may be considered stationary as well. Other connections between the housing and the housing elements are also conceivable.

When user input unit 1 is not receiving any user input, spring 3 pushes second transmission element 14 upwards, away from housing element 16. Second transmission element 14 is pushed against housing element 11, interlocking toothed edge 14E with toothed ridge 11E. Thereby, toothed ridge 11E limits how far second transmission element 14 can be pushed away from housing element 16.

Because first transmission element 12 then cannot be moved farther from housing element 16, the height of magnet 13 at that point may also be called the maximum height.

That no input is provided can be derived from the fact that the height of magnet 13 is at this maximum height, near this maximum height, or above a predetermined threshold.

At this point it is recalled that the first transmission element 12 bears on the second transmission element via the downward facing edge 12B and inward facing ridge 14B.

Input Type I—Rotation

User input unit 1 may for example receive a rotation-type input, although in other embodiments other types of input could be given. A user can operate user input unit 1 and knob 10 specifically by rotating knob 10 around axis A, for example in direction D2 as shown in FIG. 6.

When knob 10 is rotated, interlocked first transmission element 12 is rotated as well. When first transmission element 12 is rotated sufficiently far, interlocked second transmission element 14 is rotated as well, this latter interaction will be explained in more detail below.

First however, it is noted that for second transmission element 14 to be able to rotate, toothed edge 12C must follow the toothed ridge 11C. Accordingly, from a maximum height position the second transmission element 14 is forced downwards by one or a collection of teeth interacting with the rack of the housing. Further rotation allows the teeth to mesh again with the rack. Accordingly, the rotation of the second transmission element 14 causes, by virtue of the rack and cam employed, an up and down movement of the second transmission element 14.

It is noted that the downward displacement of the second transmission element 14 is defined by the rack and cam shape collectively, and is relatively minor as compared to another downward movement explained below.

As mentioned before, the first transmission element 12 rests on second transmission element 14, and is free to fall and thereby move down with second transmission element 14 under the influence of gravity. As the second transmission element 14 rises, the first transmission element 12 rises likewise. Accordingly, rotation of the knob 10 causes an up and down movement of the first transmission element 12 also. The rotation is thus converted to an oscillation of the first transmission element, in the up and down direction. The oscillation is—as coined before—of minor amplitude.

Meanwhile, spring 3 still enacts its spring force on second transmission element 14. When second transmission element 14 is rotated by about one tooth-width (the further rotation mentioned above), spring 3 urges toothed edge 14C to continue to follow the toothed ridge 11C. This causes a minor upward movement of second transmission element 14 which reverses the earlier minor downward movement. First transmission element 12, resting on second transmission element 14, is moved up with it. This engaging therefore causes a minor upward movement of first transmission element 12 and magnet 13 after the minor downward movement upon further rotation.

Rotation of knob 10 thus results in repeated up and downward movement of toothed edge 12C with toothed ridge 11C and accordingly an alternation of minor upward and downward movements of first transmission element 12 and magnet 13. This alternation of minor upward and downward movements or reciprocating movement of the first transmission element 12 and magnet 13 may also be described as an oscillation.

Accordingly, using a sensor sensing the height of the magnet, it can be induced that rotates when an oscillation in height of the magnet 13 is sensed. It is noted that readily available bases of user input devices are capable of sensing this height, so that with the user input unit, they can now also sense rotation.

Input Type II—Directional Rotation

A preferred embodiment of user input unit 1 may receive a directional rotation-type input. A user can operate user input unit 1 and knob 10 specifically by rotating knob 10 around axis A in a clockwise or a counterclockwise direction. In the preferred embodiment, it can be distinguished in which direction rotation is taking place.

Under "input type I—rotation," it is explained how, when knob 10 is rotated, the height of magnet 13 oscillates. This embodiment is an extension thereof.

In this preferred embodiment, ribbed edge 12B has outward and/or downward facing ribs 12-1 or followers. Inward facing ridge 14B, also referred to as a track, has inward and/or upward facing ribs 14-1. Edge 12B and ridge 14B preferably have a corresponding number of ridges. The side of ridge 14B on which edge 12B rests is provided with repetitions of a rib 14-1, a lower resting surface 14-2, a sloped surface 14-3 and a higher resting surface 14-4. For each such repetition a follower is provided. Accordingly a plurality of followers and corresponding tracks are available, although a single one could also be used.

When knob 10 is rotated in a clockwise direction, the clockwise sides of ridges 12-1 contact the counterclockwise sides of ridges 14-1. Accordingly, rotation of the first transmission element 12 causes co-rotation of the second transmission element 14 when the ridges 12-1, 14-1 of the respective transmission elements interact. However, since the two ridges 14-1 of the second transmission element 14 which interact with a follower 12-1 of the first transmission element 12 are at a distance from each other, the first transmission element 12 can rotate a certain distance without directly causing rotation of the second transmission element 14. Accordingly, a degree of rotational "play" is present. The resting surfaces 14-2, 14-4 and the sloped surface 14-3 in between define a track corresponding to the amount of play.

The counterclockwise sides of ridges 14-1 are adjacent to lower resting surface 14-2. Accordingly, if the knob 10 and first transmission element 12 is rotated clockwise, ridges 12-1 rest on lower resting surface 14-2. This causes the mutual positioning of first and second transmission elements 12, 14 is shown in FIGS. 8 and 9A. In this mutual positioning, the second transmission element is relatively high with respect to the first transmission element, due to their coupling in the direction of axis A taking place in the lower part of the track 14-2.

Therefore, if the knob 10 is rotated in a clockwise direction, the height of magnet 13 oscillates at or around an average height corresponding to the mutual positioning shown in FIG. 9A, which in this case is relatively low (compared to the housing 2). Thus, when an oscillation with a relatively low average is detected using the sensor, it may be induced rotation takes place in the clockwise direction.

When knob 10 is rotated in a counterclockwise direction, the counterclockwise sides of ridges 12-1 contact the clockwise sides of ridges 14-1. The clockwise sides of ridges 14-1 are adjacent to higher resting surface 14-2. Ridges 12-1 therefore rest on higher resting surface 14-4. The mutual positioning of first and second transmission elements 12, 14 is shown in FIG. 9B.

That knob 10 is rotated in a counterclockwise direction may be thus be induced from the fact that the height of magnet 13 oscillates at an average height corresponding to the mutual positioning shown in FIG. 9B, which in this case is relatively high.

Alternatively said, whether knob 10 is rotated in a clockwise or counterclockwise direction may be derived from looking at whether the height of magnet 13 oscillates at or around a higher or a lower average height. In the embodiment shown in FIGS. 8, 9A, 9B, the average of the height of magnet 13 is lower when knob 10 is rotated clockwise than when knob 10 is rotated counterclockwise.

Sloped surface 14-3 allows for ridge 12-1 to change from resting on lower surface 14-2 to resting on higher surface 14-4. For example, when knob 10 was first rotated clockwise and thereafter rotated counterclockwise.

Knob 10 and first transmission element 12 remain interlocked via gear portions 10A and 12A. Knob 10 and first transmission element 12 may be freely movable with respect to each other in the axial direction A, via the gear coupling in region R3 indicated in FIG. 4. This tolerance allows for first transmission element 12 to rotate at varying heights without also changing the height of knob 10.

It is noted that the change in average height in reaction to the change of direction should preferably be larger than the amplitude of the oscillation, and may therefore be a major upwards or downwards movement (depending on the direction) as compared to the upwards and downward movement due to the rotation per se.

Accordingly, it can be distinguished whether the knob is rotated (input type I) and in which direction (input type II).

It is noted that the length of the track along the circumferential direction may correspond to several oscillations, so that a few oscillations may be "missed" when the rotational direction of the knob is changed while the follower follows the track (to change the average height).

Input Type III—Key Press

In a preferred embodiment of user input unit 1, it may also receive a linear-type input. This is also known as a keypress. A user can operate this preferred embodiment of user input unit 1 and knob 10 specifically by pressing knob 10 in direction D1.

When knob 10 is pushed down, second transmission element 14 is pushed down as well (via the interaction between respective edges 10F and 14F. When second transmission element 14 is pushed down, spring 3 is compressed. First transmission element 12, resting on second transmission element 14, is free to move down with second transmission element 14 under the influence of gravity.

In an embodiment, knob 10 can be pushed down to only some maximum amount. Said amount can be the result of any number of factors. For example, due to a limited tolerance between knob 10 and housing element 11 or due to a maximum compression reached by spring 3. Because second transmission element 12 then cannot be moved closer to housing element 16, the height of magnet 13 at that point may also be called the minimum height.

Depression of the knob may cause more downward movement then the earlier mention major downward movement, which corresponds to downward movement caused by the follower and the track. Accordingly, an even larger downward movement can be used to derive that the knob is being depressed.

Example—Signal Readout

FIG. 11 shows a graph, in which the x-axis is a time axis and in which the y-axis represents the height of magnet 13 as sensed by a suitable sensor, in this case a Hall-sensor readily available in a keyboard, which is normally used to sense depression of keys only. For this example, a depressible key was replaced with the input unit as described herein, and the signal from the Hall-sensor was plotted in FIG. 1.

In period P1, the knob was not repressed or rotated. No input is received and the height of magnet 13 is equal to the maximum height. In period P2, a keypress is received (the knob is depressed) and the height of magnet 13 is reduced (comparatively a lot) to below the predetermined threshold and down to the minimum height.

In period P3, a counterclockwise rotation input is received and the height of magnet 13 oscillates near the maximum height $h_{max}$. The maximum change in this oscillation delta $h_1$, equal to twice the amplitude of the oscillation, corresponds to the interaction of edge 12C and toothed ridge 10C, and is relatively minor. In period P4, a clockwise rotation input is received and the height of magnet 13 oscillates near an intermediate height hr. The difference delta $h_2$ between the maximum height $h_{max}$ and the intermediate height $h_r$ may correspond to the difference in height of the higher resting surface 14-4 and the lower resting surface 14-2, and is comparatively major. In P5, no input is received and the height of magnet 13 is above the predetermined threshold $h_{th}$.

It is noted that these regions can be readily distinguished from the graph, so that the skilled person is able to infer from the signal from the Hall sensor:

whether or not the knob is being pressed;
whether or not the knob is being rotated; and
in which direction the knob is being rotated.

Alternative Embodiments

While in the embodiments discussed in FIGS. 1-11, knob 10 can be controlled by rotating it, embodiments are also conceivable in which the user input element is operable using e.g. a linear motion. The skilled person will appreciate that the cam 14C, rack 11C and track 14B can also be made in a linear fashion. In such embodiments the user input unit can be a slider. Merely by changing the shape of the transmission allows converting the linear motion of a slider to the liner motion of the magnet.

In this case, it may not be necessary to distinguish between clockwise and counterclockwise rotation.

As an example, the transmission could consist of a track and a follower, the track extending the movement range of the slider. If the track continuously increases or decreases, the position of the follower can be used to infer (using the sensor) the position of the slider.

Shown in FIGS. 12 and 13 is a further embodiment of a user input unit 1 according to the invention. In this embodiment, user input unit 1 comprises knob 20, housing element 21, and four switches 2-1, 2-2, 2-3, 2-4. These switches in this case are, but do not have to be, readily available switches otherwise used for depressible keys.

Knob 20 is provided with a hole via which knob 20 may be attached to housing element 21 via protrusion 21A in a snap-on fashion, but other connection techniques are possible.

Shown in FIGS. 14 and 15 are exploded views of the components also shown in FIGS. 12 and 13. In this embodiment, four transmission elements 22-1, 22-2, 22-3, 22-4 are arranged in housing element 21. The bottom side of housing element 21 is formed to be arranged over the four switches 2-1-2-4. Each of the four transmission elements is arranged between knob 20 a respective one of the switches 2-1-2-4. The underside of knob 20 is provided with a plurality of indentations 20A of varying depths. The transmission elements, as pegs, are arranged to each be pushed up into one of these indentations by the biasing force normally provided by the switches 2-1-2-4.

In the embodiment shown in and described in relation to FIGS. 12-16, four existing switches are used. Each switch comprises housing elements, a spring, a transmission element and a magnet. Complementary thereto, housing element 21 is manufactured such that it can be arranged, in use, on top of these switches. This approach allows for re-using existing switches. The skilled person will appreciate that further embodiments are conceivable in which the moveable components are all integrated in one housing.

In the embodiment shown in and described in relation to FIGS. 1-11, all movable components are integrated in one housing. This makes it easier to install the unit. The skilled person will appreciate that further embodiments are conceivable in which an existing switch is used and in which further housing if necessary is manufactured such that it can be arranged, in use, on top of said switch.

Operation

User input unit 1 may receive user input and whether said user input is received, or what user input is received in particular, may be derivable from the position and/or movement of the magnet in switches 2-1, 2-2, 2-3, 2-4. Specifically, this may be derived using the Hall-sensors normally available in user input devices such as keyboards.

For the embodiment shown in FIG. 12, four Hall-sensors may be arranged below the switches. Similar to the manner of operation described for the embodiment shown in FIG. 1, the Hall-sensor may output a signal directly proportional to the measured magnetic field, thus to the distance between said Hall-sensor and the magnet from the switch directly above it, thus to the height of said magnet in the user input unit. In this embodiment specifically, with transmission elements 22-1, 22-2, 22-3, 22-4 resting on said switches, the Hall-sensor may also be said to measure the height of the transmission elements.

The springs from switches push transmission elements up against knob 20. Preferably, the bottom sides of the transmission units 22-1C, 22-2C, 22-3C, 22-4C are shaped complementary to the top sides of the switches. Knob 20 is itself held in place by its connection 21A to the housing element 21.

Input Type IV—Positional Rotation

The embodiment of user input unit 1 shown in FIG. 12 may receive a positional rotation-type input. A user can operate the user input unit of this embodiment by rotating knob 20 in direction D2.

For any position of knob 20, each of the transmission units is pushed up into a corresponding indentation. Preferably, the top side of the transmission units 22-1C, 22-2C, 22-3C, 22-4C are shaped complementary to the indentations in knob 20. Accordingly, the transmission units are pushed into one of the indentations to some extent when the indentation is directly above the transmission element. A rotational position of the knob 20 can be uniquely detected by making the indentations 20B of different depths/sizes, so that the transmission elements 22-1-22-4 extend into each different indentations 20B by a different amount, so that the height at which the transmission element is, differs from indentation 20B to indentation 20B.

This is for example exemplified in FIG. 16, which shows a cross section of user input unit 1 through knob 20, housing element 21, and switches 2-1 and 2-3. FIG. 16 further shows an indentation 20A-1 that is deeper than indentation 20A-2 and accordingly, this position of knob 20 is reflected in that the transmission element corresponding to switch 2-1 is positioned lower than the transmission element corresponding to the other switch 2-3. As a result, magnet 23-2 is positioned higher than magnet 23-1 in this position of the knob. The positions of the magnets 23-1, 23-2 can be used to determine the rotational position of the knob 20, possible in combination with the positions of the magnets of other switches, depending on the exact design of primarily the indentations 20B.

As an example, FIG. 15 shows 11 indentations that, when considered in a rotational direction, increase in depth up to a maximum depth and then decrease in depth. The skilled person will recognise that there is a conceptual twelfth indentation that has the minimum depth, being zero. This maximum depth and minimum depth correspond to a maximum height and a minimum height of the transmission element directly below the corresponding indentation.

While in this embodiment the indentations are symmetrical, mirrored between the deepest and the shallowest indentation (i.e. the conceptual indentation with depth zero), embodiments are conceivable in which the indentations are not. The invention relies on the realization that using a suitable transmission, the rotational movement and position of the knob can be translated into a certain vertical displacement of the transmission elements and likewise activation of the corresponding switches. In more specific terms, it is envisioned to employ a track and a follower as a transmission, wherein in this example the indentations form the track, and the transmission elements are followers. Accordingly, it is noted that multiple followers can be used, for instance but not necessarily, on the same track. Many tracks shapes can be designed that allow inducing sufficient information from the vertical motion of the switches to derive a position or movement of the knob.

In the current example, while knob 20 is rotated, for example clockwise, to a different position, the transmission elements will change height according to the indentations that subsequently pass above them and into which they are pushed (by the switches). The height of each transmission element will show the same pattern as each indentation eventually passes above each translation element, however because at any one point in time the individual translation elements are arranged below different indentations, the height of each translation element shows this one pattern, shifted with respect to the other translation elements. As much is exemplified in FIG. 17.

FIG. 17 shows a graph with time on the X-axis and height on the Y-axis. The individual heights $h_1$-$h_4$ represent heights of the individual translation elements while knob 20 is in different rotational positions. The graph is schematic and approximate in nature. In truth, the signals would look smoother, and would include a peak or drop each time a transmission element transitions from one indentation to the next. After all, during this transition, the transmission element is pushed down shortly. However, the graph does allow to show that from the combination of heights, a unique position of knob 20 can be inferred and the input of the user thus received.

It is noted that depending on the design of the track, it may be necessary to track the latest rotational position the knob was in, in order to uniquely determine a rotation direction and/or new rotational position. Preferably are however track designs that allow unique determination of the knob's rotational position from a single reading of one or more switches.

Alternative Embodiments

The embodiment of FIG. 15 shows a plurality of indentations arranged in a circular manner. Embodiments are also conceivable in which indentations are arranged continuously increasing along a full rotation of the knob. Given that in such an embodiment each indentation has a unique depth, the position of such a knob can be determined based on the height of said transmission elements, in particular even of a single transmission element.

The skilled person will appreciate that while the embodiment of FIGS. 12-16 has switches units (or rather, is configured to cooperate with four switches), that embodiments using different amounts of switches are conceivable as well.

A further embodiment is elucidated with reference to FIGS. 18A-18C, which show a user input unit 50 with a housing 51 and a rotatable knob 52 which defines a vertical axis as coincident with its central axis. FIG. 18B shows the user input unit 50 from below, and it can be seen that the housing 51 has four apertures 53 through which transmission elements 54 extend. The transmission elements 54 are configured to cooperate with existing switches (not shown herein), in that a vertical movement of the transmission elements 54 is coupled to a vertical movement of the switches. Also shown is a support 55, and a carrier 56. The support 55 is in this case made of rubber, so that it is able to deform slightly. The deformation is used to press the support 55 in between switches of a keyboard, in order to firmly couple the support 55, and thereby the user input unit 50, to a keyboard, essentially by press fitting. Of course other connection techniques may be employed if desired.

The carrier 56 carries the knob 52 rotatably, but also allows the knob 52 to be tilted and to be pushed down and up along its axis of rotation (the vertical axis)titlt.

FIG. 18C shows the bottom of the knob 52 together with transmission elements 54 and a spring 57. The spring cooperates with the support 55 and the carrier 56 to suspend the knob 52, in particularly by biasing it away from the housing 50. Most notable is the track 58 along the circumference of the knob 52 on its bottom, which interfaces with the transmission elements 54. In this example, to show the various track designs that are possible, the track is circular, its depth is defined by a plane which is tilted with respect to a plane perpendicular to the vertical axis. Starting at a minimum depth at 59, the track thus continuously increases in depth to a maximum depth at 60 and then decreases again to the minimum in a single rotation. Similar to the previously described embodiment, the switches push up the transmission elements 54, which thus follow the track as the knob 52 is rotated. Accordingly, rotation of the knob 52 is converted by the transmission (constituted by track 58 and transmission elements 54 cooperating) into displacement along the vertical axis of the transmission elements 54 and thus depression of the switches. The rotation of the knob 52 can thereby be measured by suitable measurement of the depression of the switches, for which a normal keyboard with analog input is already outfitted.

Recalling that the carrier 56 allows depression of the knob also, all transmission elements 54 can be pushed down together by depression of the knob 52. Since this simultaneous movement of the switches can be easily distinguished via the switches from rotation of the knob, this allows for a second input method with the same knob 52.

Recalling that the carrier 56 allows tilting of the knob 52, it is also possible to lower one side of the knob 52 relative to its opposite side. In this case, one or two of the transmission elements 54 and corresponding switches would be pressed down more than the others. The resulting signals from the four switches can also readily be distinguished from rotation and depression of the knob 52, so that yet another input method is possible: the knob may be tilted to indicate a direction, similar to a joy-stick. It is however recalled that no additional hardware beyond the user input unit is needed for this behaviour, instead existing switches can be used in their original place on e.g. a keyboard.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions. Moreover, all statements herein reciting principles, aspects, and embodiments of the present invention, as well as specific examples thereof, are intended to encompass equivalents thereof.

It should be noted that the above-mentioned embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present invention can be implemented by means of hardware comprising several distinct elements and by means of a suitably programmed computer. In claims enumerating several means, several of these means can be embodied by one and the same item of hardware. The usage of the words "first," "second," "third" etc. does not indicate any ordering or priority. These words are to be interpreted as names used for convenience.

Further, the disclosure comprises embodiments according to the following clauses:

Clause 1. A user input unit (1) comprising:
  a housing (11, 15, 16) configured to be attached to a base of a user input device, such as a keyboard;
  a first movable element (12) coupled to the housing (11, 15, 16), the first movable element (12) being movable along a first direction (D1);
  a user operable second movable element (10) coupled to the housing (11, 15, 16), the second movable element being movable along a second direction (D2), the second direction (D2) being different from the first direction (D1); and
  a transmission configured to transfer movement of the second movable element along the second direction (D2) into movement of the first movable element (12) along the first direction (D1).

Clause 2. User input unit (1) according to the previous clause, wherein the first direction is a straight direction, and wherein the second direction is a rotation direction.

Clause 3. User input unit (1) according to the previous clause, wherein the first direction is substantially parallel and optionally coincident to a rotational axis defined by the second direction.

Clause 4. User input unit (1) according to clause 1, wherein the first direction is a straight direction and wherein the second direction is a straight direction, not parallel and preferably substantially perpendicular to the first direction.

Clause 5. User input unit (1) according to any of the preceding clauses, wherein the transmission is configured to convert unidirectional movement of the second movable element (10) along the second direction (D2) to a reciprocating movement of the first movable element (12) along the first direction (D1).

Clause 6. User input unit (1) according to any of the preceding clauses, wherein the transmission is configured to convert a clockwise rotation of the second movable element (10) to a reciprocating movement of the first movable element (12), along the first direction around a first average position and a counterclockwise rotation of the second movable element (10) to a reciprocating movement of the first movable element (12) along the first direction, around a second average position, different from the first average position.

Clause 7. User input unit (1) according to clause 5 or 6, wherein the transmission comprises a rack and a cam, wherein the cam is configured to follow the surface of the rack upon movement of the second movable element and in order to cause said reciprocating movement.

Clause 8. User input unit (1) according clause 7, wherein the transmission comprises a track and a follower configured to follow said track, wherein a first end of the track is located at a different position along the first direction than a second, opposite end of the track, so that a movement of the follower from the first end to the second end of the track causes the follower to move in the first direction.

Clause 9. User input unit (1) of any of the clauses 1-5, wherein the transmission comprises plurality of indentations 20A with varying depths in the first direction and a at least one peg, wherein each indentation corresponds to an angular position of the second moveable element and wherein the peg is configured to, depending on the position of the second moveable element, be arranged in the corresponding indentation.

Clause 10. User input unit according to the previous clause, comprising multiple such pegs, for instance three or four.

Clause 11. User input unit (1) of any of the preceding clauses, wherein the user input unit is substantially cylindrical, thereby defining an axis A and wherein the first direction coincides with the axis A.

Clause 12. User input unit (1) of any of the preceding clauses, wherein the transmission is further configured to transfer movement of the second movable element along the first direction to movement of the first movable element along the first direction.

Clause 13. User input unit (1) according to any of the preceding clauses, wherein the second movable element (10) is a knob.

Clause 14. User input unit (1) according to any of the preceding clauses, wherein the user operable second movable element (10) is further coupled to the housing (11, 15, 16) movably along the first direction (D2).

Clause 15. User input unit (1) according to any of the preceding clauses, wherein the first movable element (12) is detectable by a sensor included in the user input device.

Clause 16. User input unit (1) according to any of the preceding clauses, further comprising a magnet (13) fixedly attached to the first movable element (12).

Clause 17. User input unit (1) according to any of the preceding clauses, comprising multiple such first movable elements.

Clause 18. User input device, such as a keyboard, comprising:
a base;
a user input unit (1) according to any of the previous clauses,
a sensor configured to sense a movement or a position of the first movable element (14) along the first direction.

Clause 19. User input device according to clause 18, wherein the sensor is a Hall-sensor.

Clause 20. User input device according to clause 18 or 19, wherein the user input unit is detachable and/or (re) attachable from the base.

Clause 21. User input device according to any of clauses 18-20, further comprising at least one depressible key, wherein the user input unit (1) and the at least one depressible key are interchangeably attachable to the base at a position corresponding to the sensor.

Clause 22. User input device according to the previous clause, wherein the user input unit is interchangeable with any single depressible key.

Clause 23. User input device according to clause 21, wherein the user input unit is interchangeable with multiple such depressible keys collectively.

The present invention is not limited to the embodiment shown, but extends also to other embodiments falling within the scope of the appended claims.

What is claimed is:

1. A user input unit comprising:
a housing configured to be attached to a base of a keyboard;
a first movable element coupled to the housing, the first movable element being movable along a first direction, the first direction being linear;
a user operable second movable element coupled to the housing, the second movable element being movable along a second direction, the second direction being different from the first direction;
a transmission configured to transfer movement of the second movable element along the second direction into movement of the first movable element along the first direction;
wherein the keyboard comprises a sensor to sense a movement or a position of the first movable element along the first direction, and
the keyboard comprises at least one depressible key, and wherein the user input unit and the at least one depressible key are interchangeably attachable to the base at a position corresponding to the sensor.

2. The user input unit according to the claim 1, wherein the second direction is a rotation direction.

3. The user input unit according to the claim 2, wherein the first direction is parallel to a rotational axis defined by the second direction.

4. The user input unit according to claim 1, wherein the second direction is linear and non-parallel with the first direction.

5. The user input unit according to claim 1, wherein the transmission is configured to
convert unidirectional movement of the second movable element along the second direction to a reciprocating movement of the first movable element along the first direction, and/or
convert a clockwise rotation of the second movable element to a reciprocating movement of the first movable element, along the first direction around a first average position and a counterclockwise rotation of the second movable element to a reciprocating movement of the first movable element along the first direction, around a second average position, different from the first average position.

6. The user input unit according to claim 5, wherein the transmission comprises a rack and a cam, wherein the cam is configured to follow the surface of the rack upon movement of the second movable element and in order to cause said reciprocating movement.

7. The user input unit according to claim 6, wherein the transmission comprises a track and a follower configured to follow said track, wherein a first end of the track is located at a different position along the first direction than a second, opposite end of the track, so that a movement of the follower from the first end to the second end of the track causes the follower to move in the first direction.

8. The user input unit of claim 1, wherein the transmission comprises plurality of indentations with varying depths in the first direction and a at least one peg, wherein each indentation corresponds to an angular position of the second moveable element and wherein the peg is configured to, depending on the position of the second moveable element, be arranged in the corresponding indentation.

9. The user input unit according to the claim 8, comprising multiple such pegs, for instance three or four.

10. The user input unit of claim 1, wherein:

the user input unit is substantially cylindrical, thereby defining an axis and wherein the first direction coincides with the axis, and/or the transmission is further configured to transfer movement of the second movable element along the first direction to movement of the first movable element along the first direction.

11. The user input unit according to claim 1, wherein the second movable element is a knob.

12. The user input unit according to claim 1, wherein the user operable second movable element is further coupled to the housing movably along the first direction.

13. The user input unit according to claim 1, further comprising a magnet fixedly attached to the first movable element.

14. The user input unit according to claim 1, comprising multiple such first movable elements.

15. A keyboard, comprising: a base; a user input unit according to claim 1, a sensor configured to sense a movement or a position of the first movable element along the first direction, wherein optionally the sensor is a Hall-sensor.

16. The keyboard according to claim 15, wherein the user input unit is detachable and/or attachable from the base.

17. The keyboard according to claim 1, wherein the user input unit is interchangeable with any single depressible key.

18. The keyboard according to claim 17, wherein the user input unit is interchangeable with multiple such depressible keys collectively.

19. The user input unit according to the claim 2, wherein the first direction is parallel and coincident to a rotational axis defined by the second direction.

20. The user input unit according to claim 1, wherein the second direction is a straight direction, not parallel and perpendicular to the first direction.

* * * * *